(12) United States Patent
Yamada

(10) Patent No.: US 10,129,352 B2
(45) Date of Patent: Nov. 13, 2018

(54) INFORMATION MANAGEMENT METHOD

(71) Applicant: Panasonic Intellectual Property Corporation of America, Torrance, CA (US)

(72) Inventor: Mariko Yamada, Hyogo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 476 days.

(21) Appl. No.: 14/642,749

(22) Filed: Mar. 10, 2015

(65) Prior Publication Data

US 2015/0180993 A1 Jun. 25, 2015

Related U.S. Application Data

(63) Continuation of application No. PCT/JP2014/002828, filed on May 28, 2014.

(30) Foreign Application Priority Data

Jul. 26, 2013 (JP) ................................. 2013-155837

(51) Int. Cl.
*G06F 15/177* (2006.01)
*H04L 29/08* (2006.01)
(Continued)

(52) U.S. Cl.
CPC ........ *H04L 67/28* (2013.01); *G06F 17/30864* (2013.01); *G06F 21/32* (2013.01);
(Continued)

(58) Field of Classification Search
CPC ... H04L 67/28; G06F 17/30864; G06F 21/32; G06Q 10/00
(Continued)

(56) References Cited

U.S. PATENT DOCUMENTS

2009/0045914 A1* 2/2009 Hsieh ................. G06F 12/1408
340/5.74
2010/0142764 A1* 6/2010 Ikegami ............. G06K 9/00006
382/115

(Continued)

FOREIGN PATENT DOCUMENTS

JP 2012-053698 3/2012

OTHER PUBLICATIONS

International Search Report of PCT application No. PCT/JP2014/002828 dated Aug. 26, 2014.

*Primary Examiner* — David R Lazaro
*Assistant Examiner* — Mariegeorges A Henry
(74) *Attorney, Agent, or Firm* — Greenblum & Bernstein, P.L.C.

(57) ABSTRACT

An information management method includes receiving an appliance identifier of an unregistered target appliance among at least one of appliances, a gateway identifier of a home gateway, and biological information regarding a user of the unregistered appliance, determining whether among the registered appliances associated with the gateway identifier, management information regarding at least one of the appliances associated with the user of the biological information is registered in a database, registering, if the determination is yes, the management information regarding the at least one of the registered appliances in the database as management information of the unregistered appliance in association with the user of the biological information, and sending, to an information terminal of the user, display information indicating that the management information regarding the at least one of the registered appliances is registered as management information of the unregistered appliance in association with the user of the biological information.

17 Claims, 39 Drawing Sheets

(51) Int. Cl.
*G06F 17/30* (2006.01)
*G06F 21/32* (2013.01)
*G06Q 10/00* (2012.01)
*G10L 17/00* (2013.01)
*G10L 17/02* (2013.01)

(52) U.S. Cl.
CPC .............. *G06Q 10/00* (2013.01); *G10L 17/00* (2013.01); *G10L 17/02* (2013.01)

(58) Field of Classification Search
USPC .................................. 709/223, 220; 382/115
See application file for complete search history.

(56) References Cited

U.S. PATENT DOCUMENTS

| | | | | |
|---|---|---|---|---|
| 2011/0050392 | A1* | 3/2011 | Kaizu | G06F 21/32 340/5.52 |
| 2012/0108230 | A1* | 5/2012 | Stepanian | G06F 21/10 455/422.1 |
| 2012/0331184 | A1* | 12/2012 | Adar | G06F 13/28 710/22 |
| 2013/0110991 | A1* | 5/2013 | Fujimoto | H04L 29/06333 709/220 |
| 2014/0307074 | A1* | 10/2014 | Ryabov | A61B 5/117 348/77 |

* cited by examiner

FIG. 3

| GW-ID | USER ID | RELATIONSHIP | NAME | GENDER | AGE | DISPLAY DESTINATION ADDRESS | SPEAKER MODEL | FEATURE |
|---|---|---|---|---|---|---|---|---|
| G001 | U01 | FATHER | XX XX | MALE | 45 | XXX@ZY.com | SP01 | U001_* |
| | U02 | MOTHER | XX YY | FEMALE | 40 | YYY@XZ.com | SP02 | U002_* |
| | U03 | SON | XX ZZ | MALE | 15 | ZZZ@YX.com | SP03 | U003_* |
| | | | | | | | | |

| GW ID | APPLIANCE ID | TYPE | YEAR, MONTH AND DAY OF PURCHASE | USER MANAGER | USER NON-MANAGER | FREQUENCY | DISCLOSURE POLICY | DESTINATION OF LOG | LOG DATA |
|---|---|---|---|---|---|---|---|---|---|
| GW01 | K01 | TV | 04.01.2013 | U01 | U02, U03 | HIGH | DISCLOSURE Lv. 5 | COMPANY A, COMPANY B | LogK01 |
| | K02 | CLEANER | 06.03.2013 | U02 | U01 | HIGH | DISCLOSURE Lv. 3 | COMPANY B, COMPANY C, COMPANY D | LogK02 |
| | K03 | DIGITAL CAMERA | 10.25.2014 | U03 | | MEDIUM | DISCLOSURE Lv. 2 | COMPANY A | LogK03 |
| | ... | ... | ... | | | | ... | ... | ... |
| ... | | | | | | | | | |

24

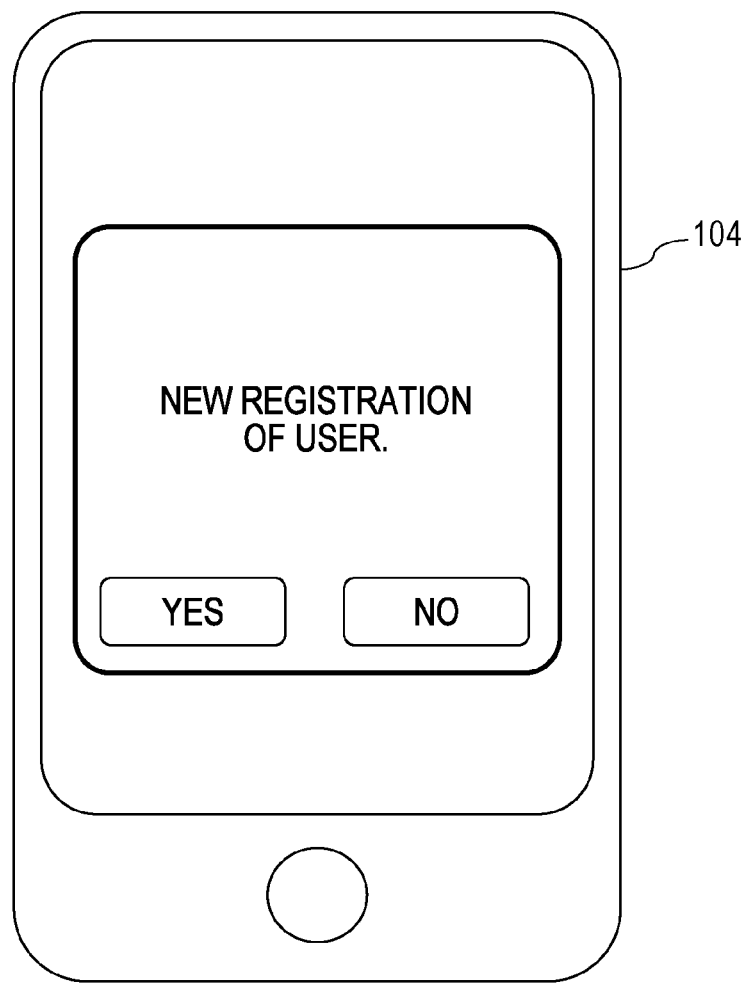

FIG. 13

```
SPEAKER MODEL
CREATION PROCESS
        │
        ▼         ┌S300
ACQUIRE SPEECH DATA  ⇔
        │
        ▼         ┌S302
GENERATE FEATURE   ⇔
    (MFCC)
        │
        ▼         ┌S304
    PERFORM       ⇔
 MODEL LEARNING
        │
        ▼
       END
```

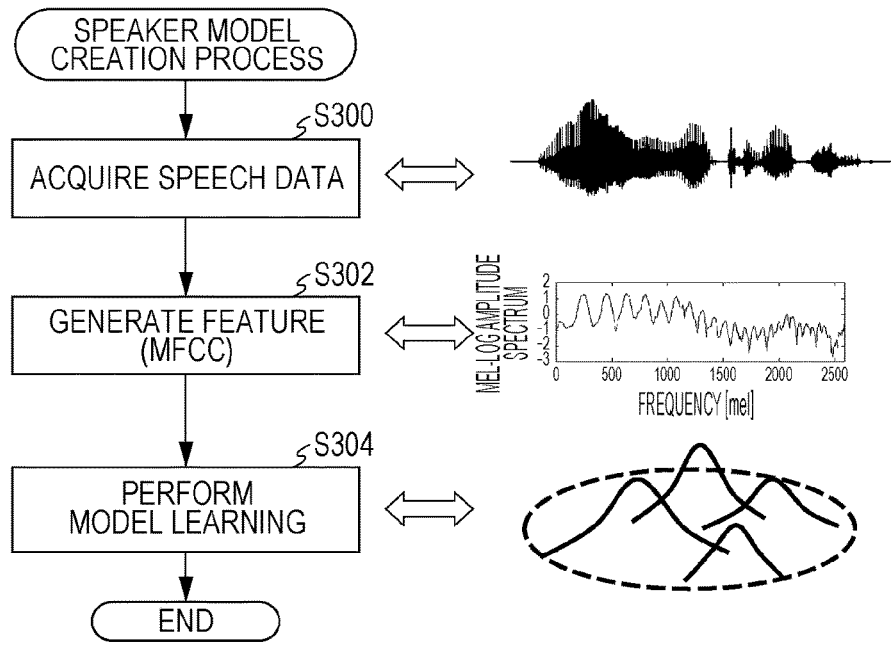

FIG. 14

```
SPEAKER IDENTIFICATION
       PROCESS
          │
          ▼         ┌S400
   OBTAIN FEATURE
       (MFCC)
          │
          ▼         ┌S402
  CALCULATE LIKELIHOOD
  BETWEEN FEATURE AND
  EACH OF MODELS TO BE
      IDENTIFIED
          │
          ▼         ┌S404
   IDENTIFY SPEAKER OF
  MODEL HAVING HIGHEST
 LIKELIHOOD AS SPEAKER
     OF INPUT SPEECH
          │
          ▼
         END
```

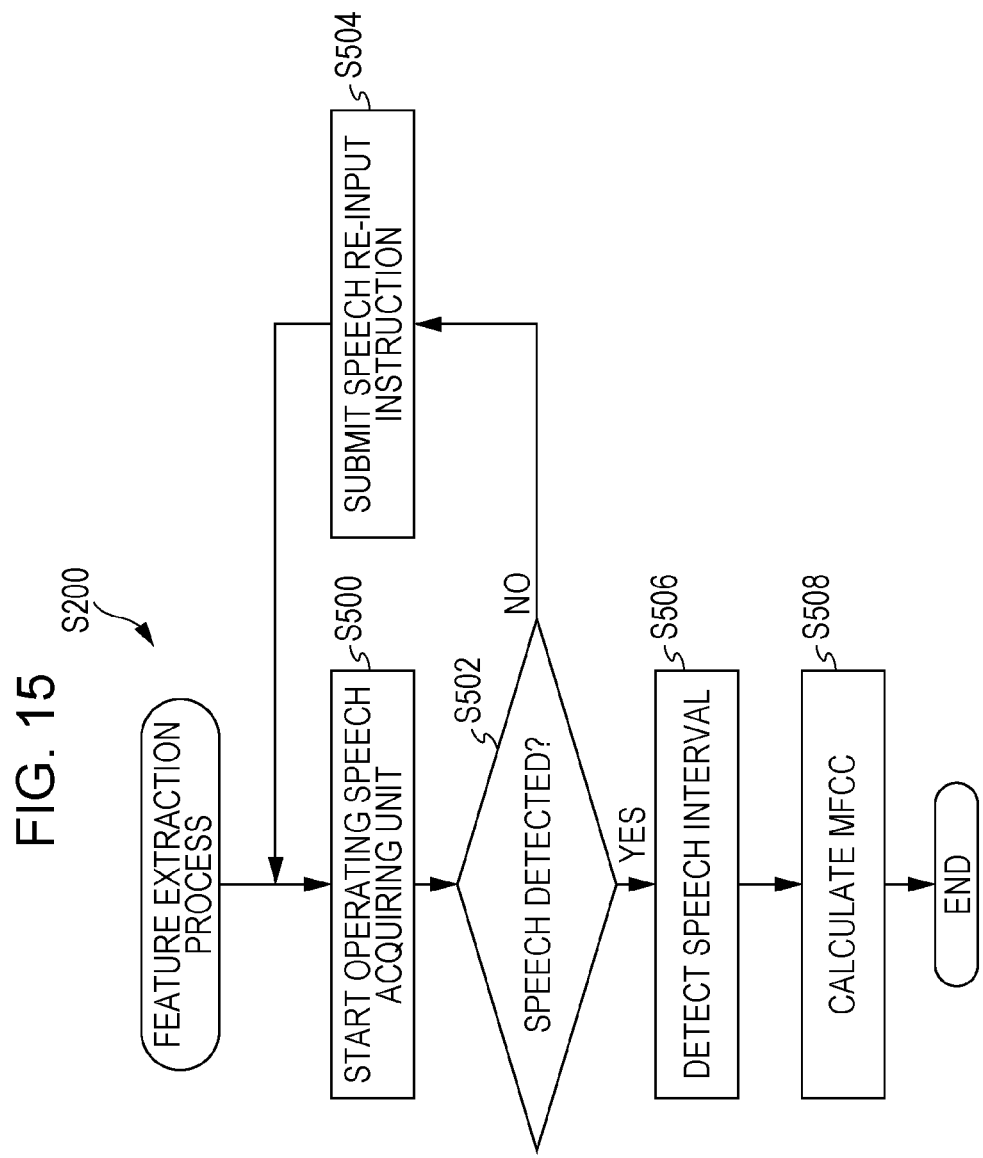

FIG. 29

| APPLIANCE ID | TYPE | YEAR, MONTH AND DAY OF PURCHASE | USER MANAGER | USER NON-MANAGER | FREQUENCY | DISCLOSURE POLICY | DESTINATION OF LOG | LOG DATA |
|---|---|---|---|---|---|---|---|---|
| K01 | TV | 04.01.2013 | U01 | U02, U03 | HIGH | DISCLOSURE Lv. 5 | COMPANY A, COMPANY B | LogK01 |
| K02 | CLEANER | 06.03.2013 | U02 | U01 | HIGH | DISCLOSURE Lv. 3 | COMPANY B, COMPANY C, COMPANY D | LogK02 |
| K03 | DIGITAL CAMERA | 10.25.2014 | U03 | | | | | |

U03 — REGISTERED AS MANAGER

FIG. 30

| APPLIANCE ID | TYPE | YEAR, MONTH AND DAY OF PURCHASE | USER | | FREQUENCY | DISCLOSURE POLICY | DESTINATION OF LOG | LOG DATA |
|---|---|---|---|---|---|---|---|---|
| | | | MANAGER | NON-MANAGER | | | | |
| K01 | TV | 04.01.2013 | U01 | U02, U03 | HIGH | DISCLOSURE Lv. 5 | COMPANY A, COMPANY B | LogK01 |
| K02 | CLEANER | 06.03.2013 | U02 | U01 | HIGH | DISCLOSURE Lv. 3 | COMPANY B, COMPANY C, COMPANY D | LogK02 |
| K03 | DIGITAL CAMERA | 10.25.2014 | U03 | | | DISCLOSURE Lv. 5 | COMPANY A, COMPANY B | |

POLICY FOR TV - REGISTERED APPLIANCE OF U03 - IS APPLIED

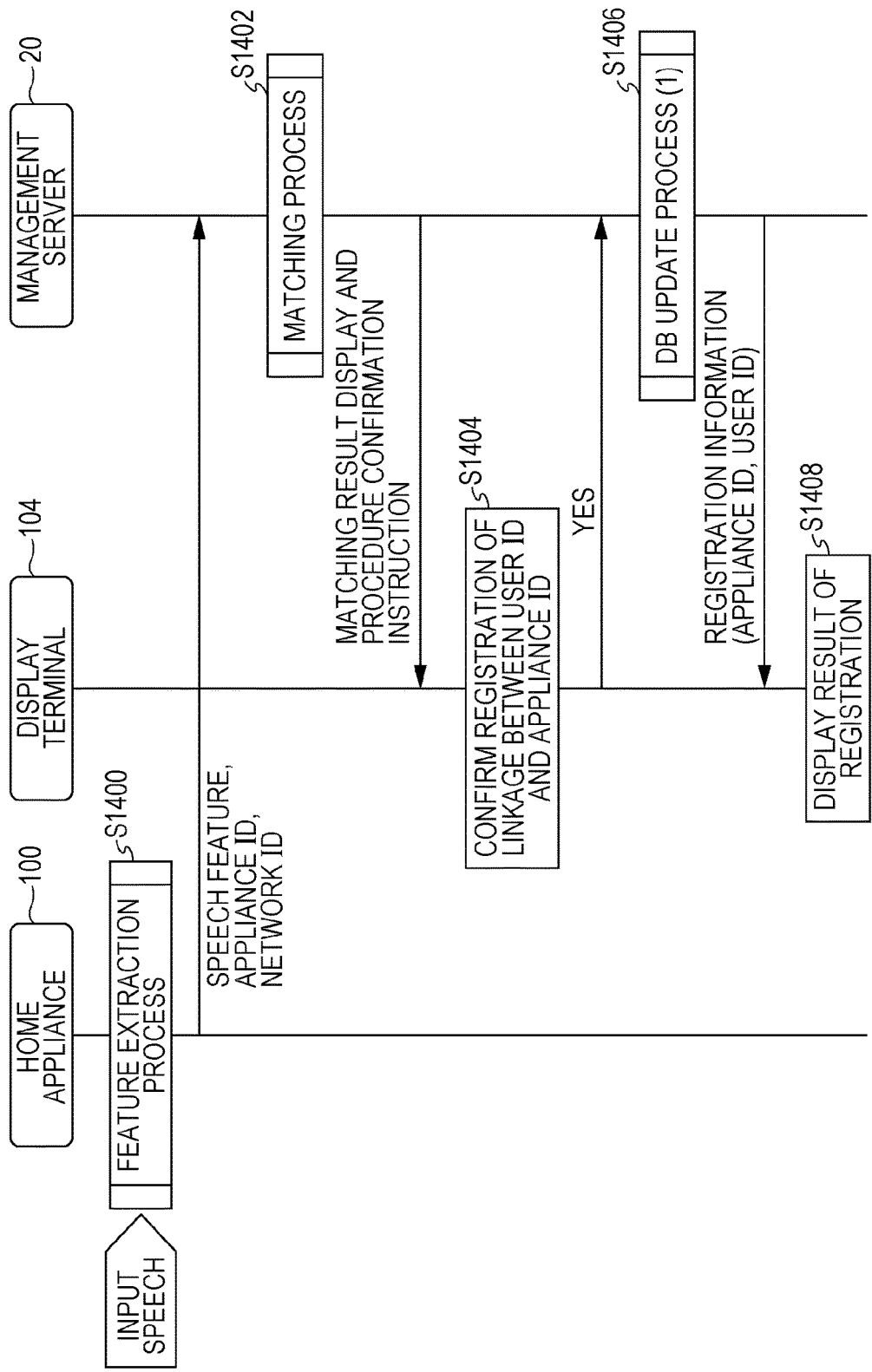

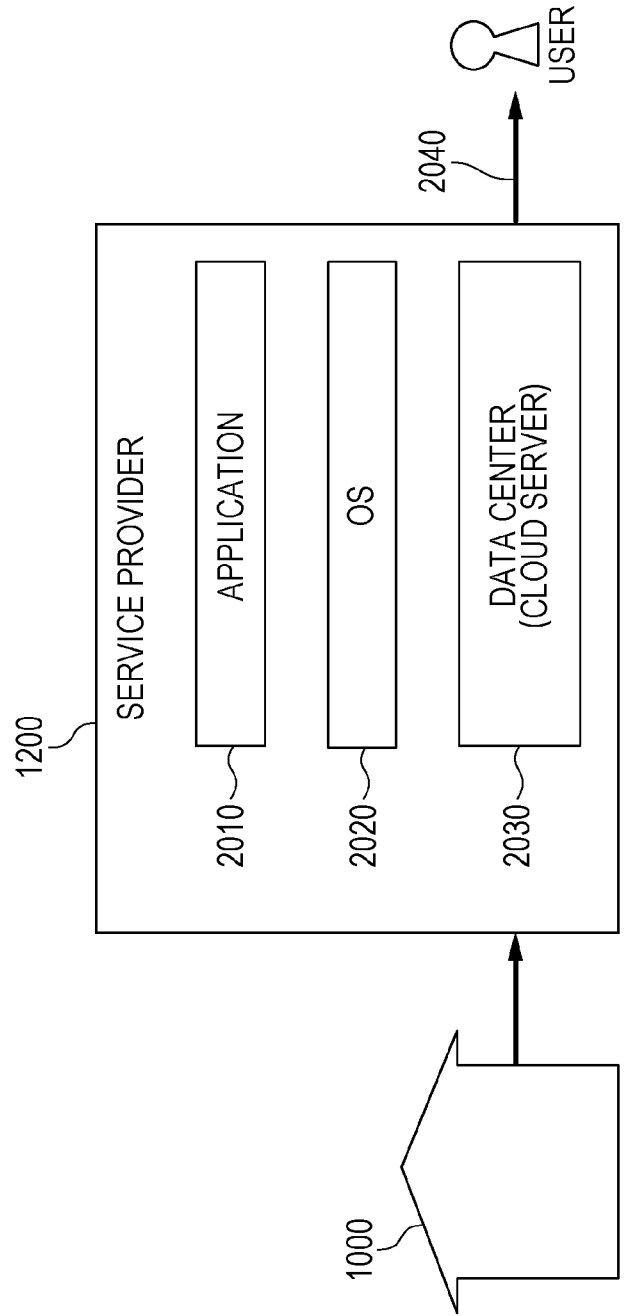

INFORMATION MANAGEMENT METHOD

BACKGROUND

1. Technical Field

The present disclosure relates to an information management method for use in an information management system that collects and manages log information regarding a registered appliance of a user and, in particular, to an information management method for registering an appliance having log information to be collected.

2. Description of the Related Art

In recent years, connection of home appliances, such as household appliances used in daily life (e.g., household affairs) or audio visual (AV) appliances, to a network has been studied. Home appliances having networking capability are sometimes called "network-connected home appliances" or "smart home appliances". Smart home appliances have, for example, Internet connectivity capability and can send and receive information via the Internet.

In the coming years, a plurality of smart home appliances are used in a house, and the smart home appliances are likely to be connected to a home network (a home LAN). Connection of the smart home appliances to a network allows users to receive a desired service from a manufacturer or a service provider via the network.

To receive such services, a user needs to register information about themselves in a server of the information management system of a manufacturer or a service provider that provides services together with the information about the smart home appliance that the user owns. Japanese Unexamined Patent Application Publication No. 2012-53698 describes a technology for simplifying the input operation performed by a user.

SUMMARY

To put an information management system that collect log information from the above-described smart home appliances and manage the information into practical use, further improvement is required.

In one general aspect, the techniques disclosed here feature an information management method for use in an information management system that collects, from at least one of target appliances, log information regarding the at least one of target appliances via a home gateway and manages the log information. The method includes receiving an appliance identifier of an unregistered target appliance among the at least one of target appliances, a gateway identifier of the home gateway, and biological information regarding a user of the unregistered target appliance, determining whether among the registered appliances associated with the gateway identifier, management information regarding at least one of the target appliances associated with the user of the biological information is registered in a database, registering, if the management information regarding at least one of the target appliances associated with the user of the biological information is registered in the database, the management information regarding the at least one of the registered target appliances in the database as management information of the unregistered target appliance in association with the user of the biological information, and sending, to an information terminal of the user, display information indicating that the management information regarding the at least one of the registered target appliances is registered as management information of the unregistered target appliance in association with the user of the biological information.

These general and specific aspects may be implemented using a system, a method, and a computer program, and any combination of systems, methods, and computer programs.

According to the above-described aspect, further improvement has been achieved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 illustrates a particular example of a user management DB;

FIG. 4 illustrates a particular example of an appliance management DB;

FIG. 12 illustrates an example of an initial registration screen displayed on a display of a display terminal;

FIG. 13 is a flowchart illustrating the procedure for a process for creating a speaker model from learning data;

FIG. 14 is a flowchart illustrating the procedure for a process for identifying a speaker;

FIG. 15 is a flowchart illustrating the procedure for a feature extraction process;

FIG. 29 illustrates the appliance management DB having a user having a user ID of "U03" (a son (FIG. 23)) added thereto;

FIG. 30 illustrates the appliance management DB to which existing management information regarding a TV is applied as management information for the disclosure policy of log information regarding the digital camera and the destination of log of the digital camera;

FIG. 37 illustrates a sequence of communication processes performed when the user registers an appliance together with the user information for the first time in the information management system without a gateway;

FIG. 39 illustrates the overall configuration of a service provided by the information management system using the type 1 of service (a cloud service of a company-owned data center type);

DETAILED DESCRIPTION

Figure 1:
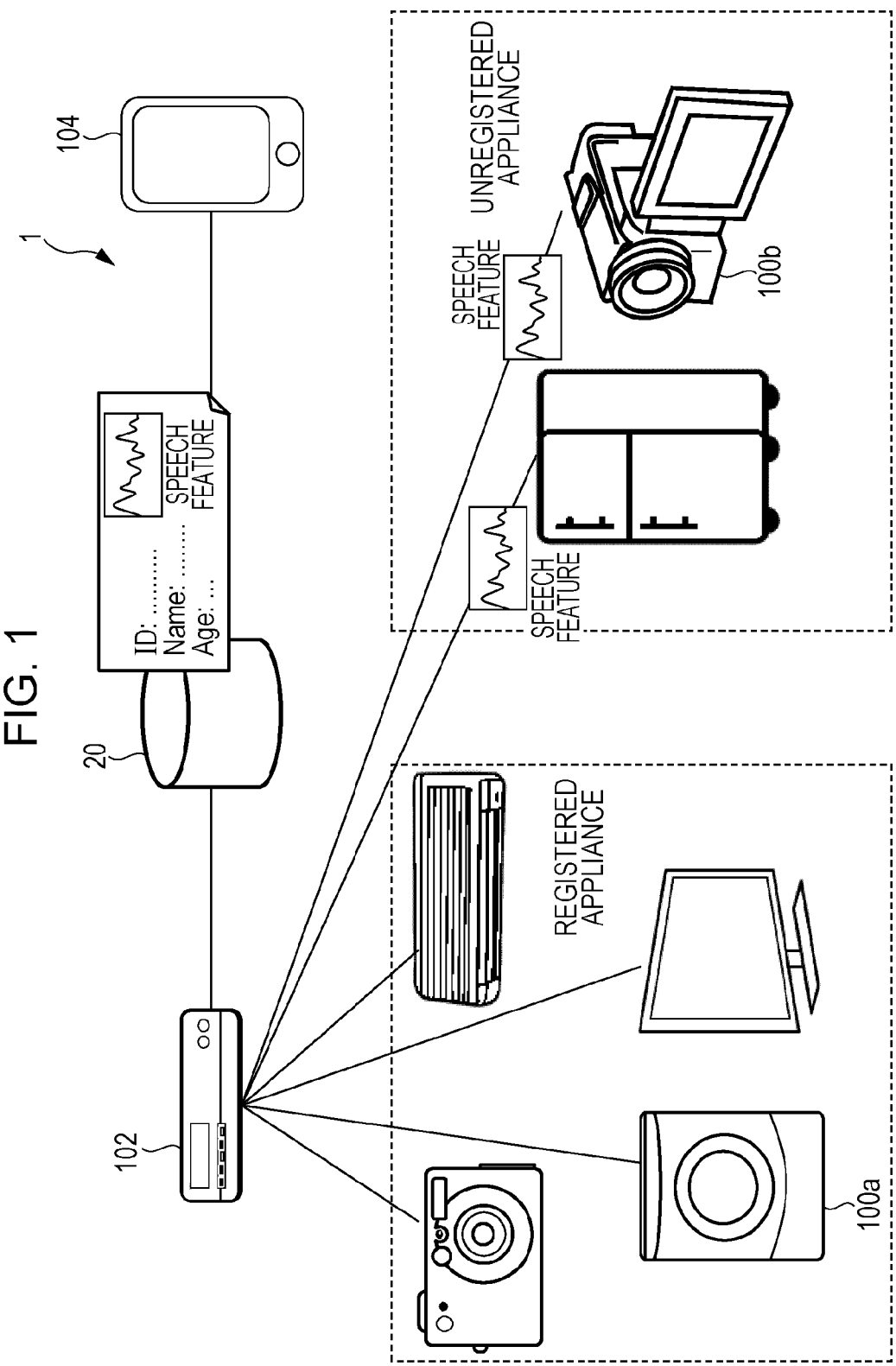
FIG. 1 is a schematic illustration of the configuration of an information management system according to an exemplary embodiment.

According to an information management system proposed by the present inventors, a provider of a service (hereinafter referred to as a "service provider") collects log information from a smart home appliance of a user via a network, manages the collected log information, and provides a service to the user on the basis of the collected log information.

Note that for simplicity, a smart home appliance is simply referred to as "home appliance" or "appliance".

To appropriately provide a service about a home appliance of a user via a network, the service provider needs to manage a variety of types of information about the user. As used herein, the term "information" refers to information regarding the user, information regarding the home appliance that the user owns, and information regarding the settings of the home appliance. By managing such information, the service provider can appropriately identify a user who wants to receive a service and home appliances that the user owns and provide the service to the user. For this reason, the service provider asks the user to register the home appliances in the information management system.

However, it is significantly troublesome for the user to input a variety of types of information regarding each of the home appliances.

For example, Japanese Unexamined Patent Application Publication No. 2012-53698 describes a technology for simplifying an input operation performed by a user. According to Japanese Unexamined Patent Application Publication No. 2012-53698, a combination of values previously input for each of input screens (windows) is stored. When presenting an input screen to the user, an input value that has been most frequently input is displayed in the input screen as a default value.

More specifically, according to Japanese Unexamined Patent Application Publication No. 2012-53698, an operation terminal sends a user ID to an input assistance device. The input assistance device reads out a plurality of priority tables each corresponding to the user ID and sends, to the operation terminal, a plurality of candidate screen data having a combination of input items extracted from the priority tables input herein. Thus, the candidate screen data are displayed. Among a plurality of candidate screens, the operation terminal selects one of the candidate screens and sends the selected one to the input assistance device. The input assistance device stores the input value for each of the items received from the operation terminal. Thereafter, the input assistance device compares the input value with a previously stored input value and updates the priority.

However, according to the technology described in Japanese Unexamined Patent Application Publication No. 2012-53698, an input screen having a preset input value displayed therein is displayed on a display terminal of the user. Accordingly, the user needs to check the input value and perform an operation to accept the input value. At that time, Japanese Unexamined Patent Application Publication No. 2012-53698 does not describe how to decrease the number of communications between the operation terminal of the user and a network system or how to decrease the number of processes performed between the operation terminal of the user and the network system.

In addition, the technology described in Japanese Unexamined Patent Application Publication No. 2012-53698 describes a system that sets up an input value for each of the input items of a plurality of network devices (e.g., a router or a switch) using a personal computer serving as an operation terminal having an input interface that allows the input value for an input item to be input. Accordingly, every time a new network device is added, input of settings to the new network device from the operation terminal is required. Thus, the input of settings from the operation terminal to the network device cannot be omitted. As a result, every time a new network device is added, the same operation is repeated in order to input settings from the operation terminal to the new network device via the input assistance device. The number of processes performed by the network system increases and, thus, the processing load imposed on the above-described system increases.

In addition, although assistance is provided from the input assistance device, the same information needs to be input from the operation terminal to the new network device. Thus, the input operation performed by the user of the operation terminal is cumbersome.

Furthermore, the operation terminal is a PC having an input interface that allows an input value of an input item to be input. That is, the operation terminal is far from an appliance without a display (e.g., a refrigerator or a washing machine) or an appliance with a display having a function that is insufficient to input information. Accordingly, when information is input using such an appliance without a display or an appliance having a function that is insufficient to input information, the technology described in Japanese Unexamined Patent Application Publication No. 2012-53698 is not applicable.

Accordingly, in order to improve the function of an information management system, the present inventors propose the following techniques.

According to an aspect of an information management method for use in an information management system that collects, from at least one of target appliances, log information regarding the at least one of target appliances via a home gateway and manages the log information, the method includes receiving an appliance identifier of an unregistered target appliance among the at least one of target appliances, a gateway identifier of the home gateway, and biological information regarding a user of the unregistered target appliance, determining whether among the registered appliances associated with the gateway identifier, management information regarding at least one of the target appliances associated with the user of the biological information is registered in a database, registering, if the management information regarding at least one of the target appliances associated with the user of the biological information is registered in the database, the management information regarding the at least one of the registered target appliances in the database as management information of the unregistered target appliance in association with the user of the biological information, and sending, to an information terminal of the user, display information indicating that the management information regarding the at least one of the registered target appliances is registered as management information of the unregistered target appliance in association with the user of the biological information.

In this manner, for example, when initial registration is performed in order to add a new target appliance to the information management system and, thus, the name and address of the user and other items, for example, need to be input, the management information regarding another target appliance registered in the information management system can be applied to the management information regarding the target appliance to be initially registered by simply sending the biological information regarding the user and the appliance ID of the target appliance to be initially registered.

Accordingly, when a new target appliance is added and is initially registered, the management information regarding the target appliance can be set up in the information management system without, for example, requesting the user to input the management information to the information terminal of the user. Thus, the number of processes performed by a server of the information management system can be reduced, which in turn can reduce the processing load imposed on the server.

In addition, the need for the user to send the same item from each of different target appliances to the information management system a plurality of times is eliminated. By simply sending the biological information regarding the user and the appliance ID of the target appliance to the information management system, registration of the target appliance can be completed. Accordingly, a troublesome input operation performed by the user can be removed. Thus, for example, different management information settings for the target appliances caused by incorrect data input by the user can be prevented. Furthermore, the number of communication activities performed between the target appliance of the user and the information management system can be reduced. Alternatively, the number of processes performed between the target appliance of the user and the information management system can be reduced.

In addition, the management information can be set up in the information management system using even the target appliance without an input interface (e.g., even when the target appliance does not include a display or the target appliance includes a display that is insufficient to input the management information).

Furthermore, according to the above-described information management method, if it is determined that management information regarding at least one of the target appliances associated with the user of the biological information is not registered in the database, a message prompting the user to input management information regarding the unregistered target appliance is sent to the information terminal of the user.

Still furthermore, according to the above-described information management method, if it is determined that at least one of the target appliances associated with the user of the biological information is not registered in the database, it is determined whether management information regarding at least one of the target appliances of the same type as the type of the unregistered target appliance among the registered appliances associated with the gateway identifier is registered in the database. If it is determined that management information regarding at least one of the target appliances of the same type as the type of the unregistered target appliance is registered in the database, the management information of the at least one of the registered target appliances of the same type as the type of the unregistered target appliance is registered as management information regarding the unregistered target appliance in association with the user of the biological information, and display information indicating that the management information regarding the at least one of the registered target appliances of the same type is registered as management information of the unregistered target appliance in association with the user of the biological information is sent to the information terminal of the user.

According to the aspect, even when it is determined that at least one of the target appliances associated with the user of the biological information is not registered in the database, the management information regarding a registered target appliance of the same type among the target appliances connected to the same home gateway is used for the newly registered target appliance. Any target appliance connected to the same home gateway can be considered as, for example, a target appliance whose manager is one of the members of the same family. Accordingly, even when the management information regarding the registered target appliance is used for the new target appliance, it is highly likely that the management information is directly applied. For example, even when a registered target appliance associated with a son is not present, the registered management information (e.g., the disclosure policy of log information) regarding a TV disposed in a living room can be applied when the son newly registers a TV for himself.

In this manner, when a new target appliance is added and is initially registered, the management information regarding the target appliance can be set up in the information management system without requesting the user to input the management information to, for example, an information terminal of the user. Thus, the number of processes performed by a server of the information management system can be reduced, which in turn can reduce the processing load imposed on the server.

In addition, the need for the user to send the same item from each of different target appliances to the information management system a plurality of times is eliminated. By simply sending the biological information regarding the user and the appliance ID of the target appliance to the information management system, registration of the target appliance can be completed. Accordingly, a troublesome input operation performed by a user can be removed.

Furthermore, according to the above-described information management method, if it is determined that management information regarding at least one of the target appliances of the same type as the type of the unregistered target appliance is not registered in the database, a message prompting the user to input management information regarding the unregistered target appliance is sent to the information terminal of the user.

Still furthermore, according to the above-described information management method, after sending the display information, instruction information indicating correction of the registration information registered as the management information regarding the unregistered target appliance is received, and the registration information registered in the database as the management information regarding the unregistered target appliance is corrected on the basis of the instruction information.

According to the above-described information management method, the display information is sent to the information terminal in response to an access from the information terminal to the information management system.

According to the above-described information management method, the biological information is, for example, information representing speech of the user.

According to the aspect, the information representing speech of the user is used as the biological information. Since pieces of speech information regarding respective members of even the same family differ from one another, it can be determined which member of the family has which speech. Accordingly, among at least one of the target appliances connected via the home gateway, the management information regarding a new target appliance can be managed in association with an individual family member living in the same house. For example, when a second TV is disposed in a study room of the father, the management information regarding the second TV can be managed in association with the father who is one of the family members.

According to the above-described information management method, the biological information is information representing a fingerprint of the user.

According to the above-described information management method, the biological information is information representing a blood capillary spatial pattern of the retina of the user.

According to the above-described information management method, the biological information is information representing a feature of the iris of the user.

According to the above-described information management method, the biological information is information representing a vein spatial pattern of the user.

According to the above-described information management method, the biological information includes one of the shape of a palm, the face, the shape of an ear, at least one of a trajectory, a speed, and a writing pressure occurring in handwriting, and lip movement of the user.

According to the above-described information management method, the management information is a user ID representing the user.

According to the above-described information management method, the management information is the type of log information collected from each of the at least one of the target appliances.

According to the above-described information management method, the type of log information is information as to whether each of the at least one of the target appliances is on/off.

According to the above-described information management method, the management information is information representing a business operator that provides the log information collected from each of the at least one of the target appliances.

According to another aspect of an information management method for use in an information management system that collects, from at least one of target appliances, that collects, log information regarding the at least one of target appliances via a network and manages the log information, the method includes receiving an appliance identifier of an unregistered target appliance among the at least one of target appliances, a network identifier for identifying a network area to which the at least one of users belongs, and biological information regarding a user of the unregistered target appliance, determining whether among the registered appliances associated with the gateway identifier, management information regarding at least one of the target appliances associated with the user of the biological information is registered in a database, registering, if the management information regarding at least one of the target appliances associated with the user of the biological information is registered in the database, the management information regarding the at least one of the registered target appliances in the database as management information of the unregistered target appliance in association with the user of the biological information, and sending, to an information terminal of the user, display information indicating that the management information regarding the at least one of the registered target appliances is registered as management information of the unregistered target appliance in association with the user of the biological information.

According to the above-described information management method, the biological information is information representing speech of the user.

A data providing method for use in a service providing system according to an embodiment of the present disclosure is described below with reference to the accompanying drawings.

Each of the embodiments described below is a particular example of the present disclosure. A value, a shape, a material, a constituent element, the positions and the connection form of the constituent elements, steps, and the sequence of steps described in the embodiments are only examples and shall not be construed as limiting the scope of the present disclosure. In addition, among the constituent elements in the embodiments described below, the constituent element that does not appear in an independent claim at the time of, for example, application is described as an optional constituent element. In addition, all the embodiments may be combined in any way.

1. Overview of Provided Services

The overview of services provided by the information management system according to the present embodiment is described first.

Figure 38A:
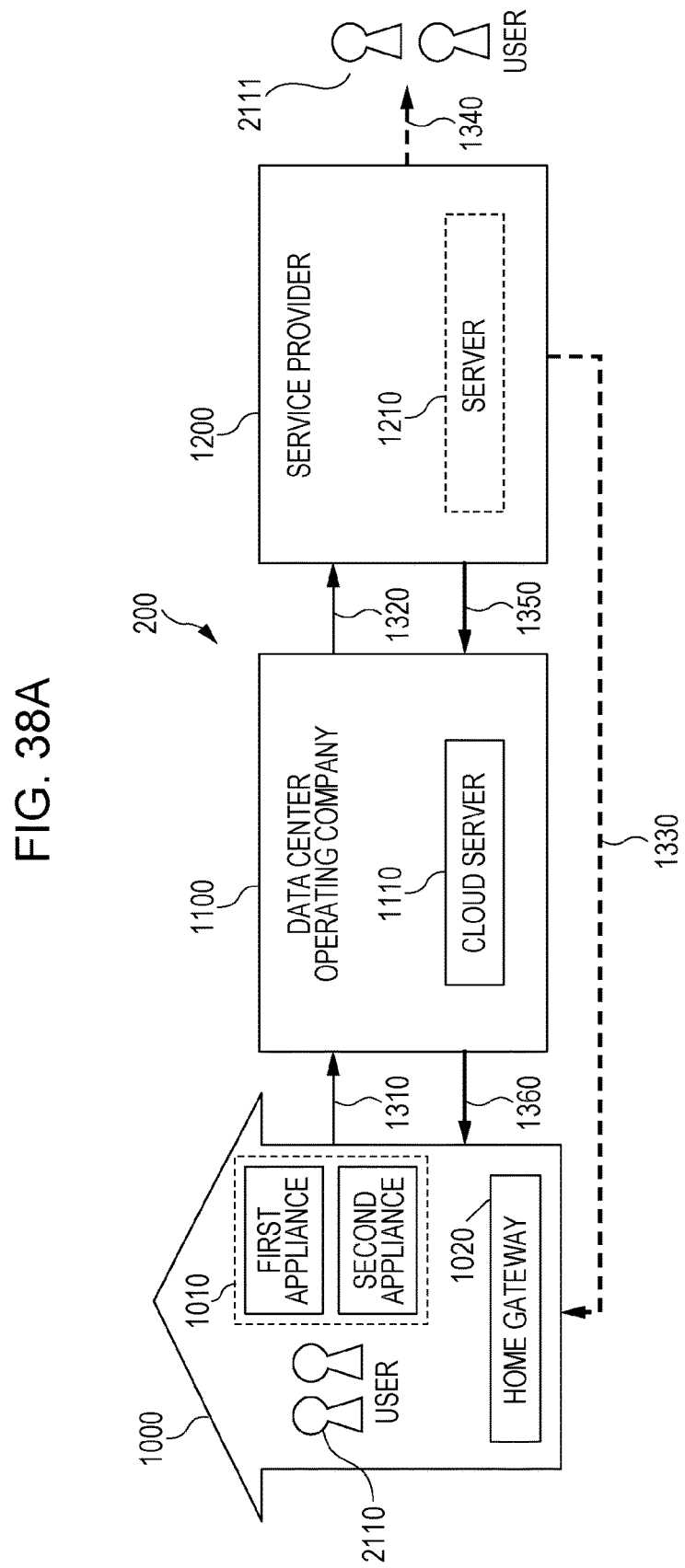
FIG. 38A illustrates the overview of services provided by an information management system according to an exemplary embodiment.

FIG. 38A illustrates the overview of the services provided by an information management system 200 according to the present embodiment. The information management system 200 includes a user group 1000, a data center operating company 1100, and a service provider 1200.

The user group 1000 represents, for example, a business enterprise, an association, or a family. The user group may be of any size. The user group 1000 includes a plurality of appliances 1010 including a first appliance and a second appliance and a home gateway 1020. Each of the plurality of appliances 1010 has a communication function so as to be capable of receiving and/or transmitting data from/to another appliance. The plurality of appliances 1010 include appliances having a configuration and a function to be directly connected to the Internet and appliances without such a configuration and a function. Examples of the former type of appliance include, for example, a smartphone, a tablet, a dedicated display terminal, a personal computer (PC), or a television set. Examples of the latter type of appliance include, for example, lighting equipment, a washing machine, and a refrigerator. Examples of the latter type of appliance can further include an appliance connectable to the Internet by using the home gateway 1020. At least one of users 2110 uses the appliances 1010 disposed in the user group 1000. Note that for convenience of description, the users 2110 are described. That is, the users 2110 are not included in the information management system 200.

The home gateway 1020 receives, from each of the appliances 1010, log information regarding the operation of the appliance 1010 and sends the received log information to a cloud server 1110. The home gateway 1020 accumulates the log information and sends the accumulated log information to the cloud server 1110, for example, once a day. Although only one home gateway 1020 appears in FIG. 38A, the number of the home gateways 1020 is only an example. A plurality of home gateways may be disposed. If a plurality of home gateways are disposed, a home gateway connected to, for example, an external network (a parent home gateway) has the other home gateways (child home gateways) connected thereto. For example, the child home gateway receives, from at least one of the appliances 1010, the log information and accumulates the log information.

Thereafter, the child home gateway uploads the log information into a server via the parent home gateway. Alternatively, the child home gateway may output a signal to operate at least one of the appliances 1010 via the parent home gateway.

The data center operating company 1100 includes the cloud server 1110. The cloud server 1110 is a virtual server that cooperates with a variety of appliances via, for example, the Internet. In general, the cloud server 1110 manages, for example, a large number of data groups that are difficult to process using an existing and widely used technology, such as a widely used database management tool. The large number of data groups are called "big data". The data center operating company 1100 manages data, manages the cloud server 1110, and operates a data center that manages the data and the cloud server 1110. The services provided by the data center operating company 1100 are described in more detail below.

Figure 38B:
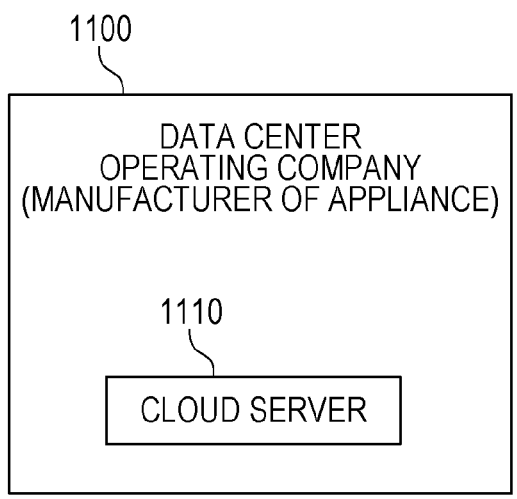
FIG. 38B illustrates an example in which an appliance manufacturer corresponds to a data center operating company.
Figure 38C:
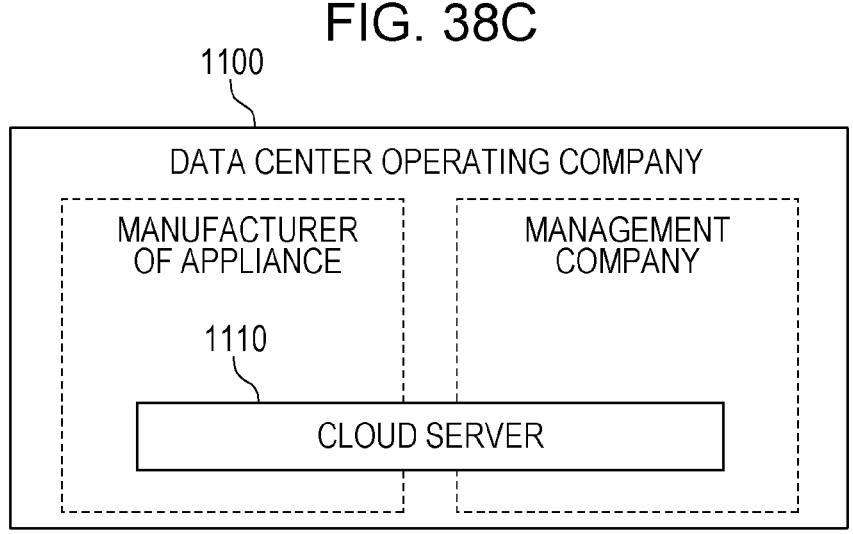
FIG. 38C illustrates an example in which either an appliance manufacturer or a management company or both correspond to the data center operating company.

The data center operating company 1100 is not limited to a data center operating company that manages only the data and the cloud server 1110. FIGS. 38B and 38C illustrate modifications of the data center operating company 1100. FIG. 38B illustrates an appliance manufacturer that functions as the data center operating company 1100. If the appliance manufacturer that develops and manufactures a plurality of appliances included in the appliances 1010 manages the data or the cloud server 1110, the appliance manufacturer corresponds to the data center operating company 1100. In addition, FIG. 38C illustrates a plurality of companies that manage the cloud server 1110 in cooperation with one another. As described above, the data center operating company 1100 is not limited to one company. If the appliance manufacturer and the management company manage the data or the cloud server 1110 by allotting part of the operation to each, both or one of the appliance manufacturer and the management company corresponds to the data center operating company 1100. Note that even when the appliance manufacturer and a management company manage the data or the cloud server 1110 in cooperation with each other or by allotting part of the operation to each, only one of the appliance manufacturer and the management company may function as the data center operating company 1100. In addition, the data center operating company 1100 may have a function of a service provider.

In addition to hardware (a computer), the above-described cloud server 1110 may be realized in the form of software (a program representing the functions required for the cloud server 1110).

The service provider 1200 includes a server 1210. If the "server 1210" represents a computer or a recording medium having a function of providing data or a service based on the data, the server 1210 may be of any scale. For example, since data is provided using a personal PC, the personal PC itself or a memory in the personal PC is also included in the category of a "server". In addition, in some cases, the service provider 1200 does not have the server 1210 disposed therein.

Note that in the above-described information management system 200, the home gateway 1020 is not an essential component. For example, if the cloud server 1110 manages all the data, the need for the home gateway 1020 may be eliminated. In addition, if all the appliances in a house have the Internet connectivity configuration and function and, thus, an appliance that cannot connect to the Internet is not present, the need for the home gateway 1020 may be eliminated. The log information may be directly provided from each of the plurality of appliances 1010 to the cloud server 1110.

The flow of information in the above-described information management system 200 is described next.

The first appliance and/or the second appliance of the user group 1000 send the log information thereof to the cloud server 1110 of the data center operating company 1100. The cloud server 1110 receives the log information sent from the appliance and accumulates the received log information (an arrow 1310 illustrated in FIG. 38A).

As used herein, the term "log information" refers to information indicating, for example, the operating conditions or the operation date and time of each of the appliances 1010. More specifically, examples of log information include, but are not limited to, a television viewing history for a television set, video recording timer setting information for a recorder, the operating date and time for a washing machine, the amount of washed laundry for a washing machine, and the date and time or the number of the door opening and closing operations for a refrigerator. The log information may include a variety of information that can be obtained from a variety of appliances. Note that the log information can be directly provided from each of the plurality of appliances 1010 to the cloud server 1110 via the Internet. Alternatively, the log information sent from the plurality of appliances 1010 may be temporarily accumulated in the home gateway 1020. Thereafter, the accumulated log information may be provided from the home gateway 1020 to the cloud server 1110.

Subsequently, the cloud server 1110 of the data center operating company 1100 converts the accumulated log information into a certain unit of log information and provides the unit of log information to the service provider 1200. As used herein, the term "certain unit of log information" refers to a unit of log information that can be provided to the service provider 1200 after the data center operating company 1100 organizes the accumulated information or a unit of log information that the service provider 1200 requests. Note that to provide the log information, the log information is not necessarily the certain unit of log information. The amount of the provided log information may vary in accordance with the conditions. The log information is stored in the server 1210 owned by the service provider 1200 as needed (an arrow 1320 illustrated in FIG. 38A).

Thereafter, the service provider 1200 organizes the log information into information that suits a service provided to the user and provides the information to the user. The user to be provided with the information may be the users 2110 who use the plurality of appliances 101 or the users 2111 outside. To provide the information to the users 2110 or the users 2111, the service provider 1200 may directly provide the information to the users 2110 or the users 2111, for example (arrows 1330 and 1340 illustrated in FIG. 38A). Alternatively, to provide the information to the users 2110, the information may be provided to the users 2110 via the cloud server 1110 of the data center operating company 1100 again, for example (arrows 1350 and 1360 illustrated in FIG. 38A). Note that instead of the service provider 1200, the cloud server 1110 of the data center operating company 1100 may organize the log information into the information that suits the service provided to the user. The cloud server 1110 may send the organized information to the service provider 1200.

Note that the user 2110 may differ from the user 2111 or may be the same as the user 2111. In addition, the plurality of appliances 1010, the cloud server 1110, and/or the server 1210 need not be located in the same country. For example, the plurality of appliances 1010 may be located in Japan, and the cloud server 1110 and/or the server 1210 may be located in the United States, and vice versa. When the cloud server 1110 and/or the server 1210 can provide, for example, the result of analysis in response to the operation (the control) performed by the user 2110 and if the user can receive the result of analysis using, for example, a PC, it can be said that the user gains benefit of the information management system 200 in the country of the user. Thus, the information management system 200 is virtually located in one country.

Note that if in collecting the log information (the arrows 1310 and 1320 illustrated in FIG. 38A) and in providing the information (the arrows 1330, 1340, 1350, and 1360 illustrated in FIG. 38A), the information contains information used to identify individual users 2110, there is a risk of the information being exploited. Accordingly, the information used to identify individual users 2110 (e.g., the names of the users 2110) may be excluded from the information. If the information used to identify individual users 2110 is contained, the appliance serving as a sender may encrypt the information and send the information. In addition, the cloud server 1110 of the data center operating company 1100 may organize the log information into information that suits a service provided to the user and provide the information to the service provider 1200.

2. Configuration of Information Management System

The service providing system according to the present embodiment is described in more detail next with reference to FIG. 1 and all subsequent figures.

FIG. 1 is a schematic illustration of the configuration of the information management system 1 according to the present embodiment.

The information management system 1 collects the log information regarding at least one of target appliances from the at least one of target appliances via a home gateway 102 (hereinafter referred to as a "gateway 102"). In the present embodiment, the term "target appliance" refers to an appliance having a function of outputting the log information to the outside. According to the present embodiment, an appliance that is allowed to collect and manage the log information is an appliance owned by a user who has registered the appliance (a registered appliance). Thereafter, the information management system 1 provides a service, such as the history of power consumption of the registered appliance, the use history of the registered appliance, and remaining life estimation based on these histories.

Before collecting the log information, a management server 20 requests the user to register the information regarding the user and the appliance for which the log information is to be collected. If the user completes the registration process, the management server 20 stores the information regarding the registered appliance (e.g., a washing machine 100a) in the database in association with the user.

Once the user registers an appliance disposed in a house with the exemplary information management system 1 using speech information, which is an example of biological information, the information management system 1 continuously maintains the speech feature of the user. When the user starts an appliance that is not yet registered (an unregistered appliance, such as a video camera 100b), the user inputs speech into the unregistered appliance. Thereafter, the management server 20 determines, using the speech feature received together with a gateway ID, whether among a plurality of registered appliances associated with the same gateway ID, any registered appliance associated with the user having the speech feature and having management information registered in the database is present. In the example illustrated in FIG. 1, the washing machine 100a corresponds to such a registered appliance. If it is determined that such a registered appliance is present, the management server 20 further registers the management information regarding the particular registered appliance in the database in association with the user having the speech feature as the management information regarding the unregistered appliance. The management sever 20 sends, to a display terminal 104 (e.g., a cell phone) of the user, display information indicating that the management information regarding the particular registered appliance is registered in association with the user as management information regarding the unregistered appliance (the video camera 100b).

That is, according to the information management system 1, if the user registers an appliance using their speech once, the user can perform initial registration for a new appliance without needing to input the above-described management information again.

Figure 2:
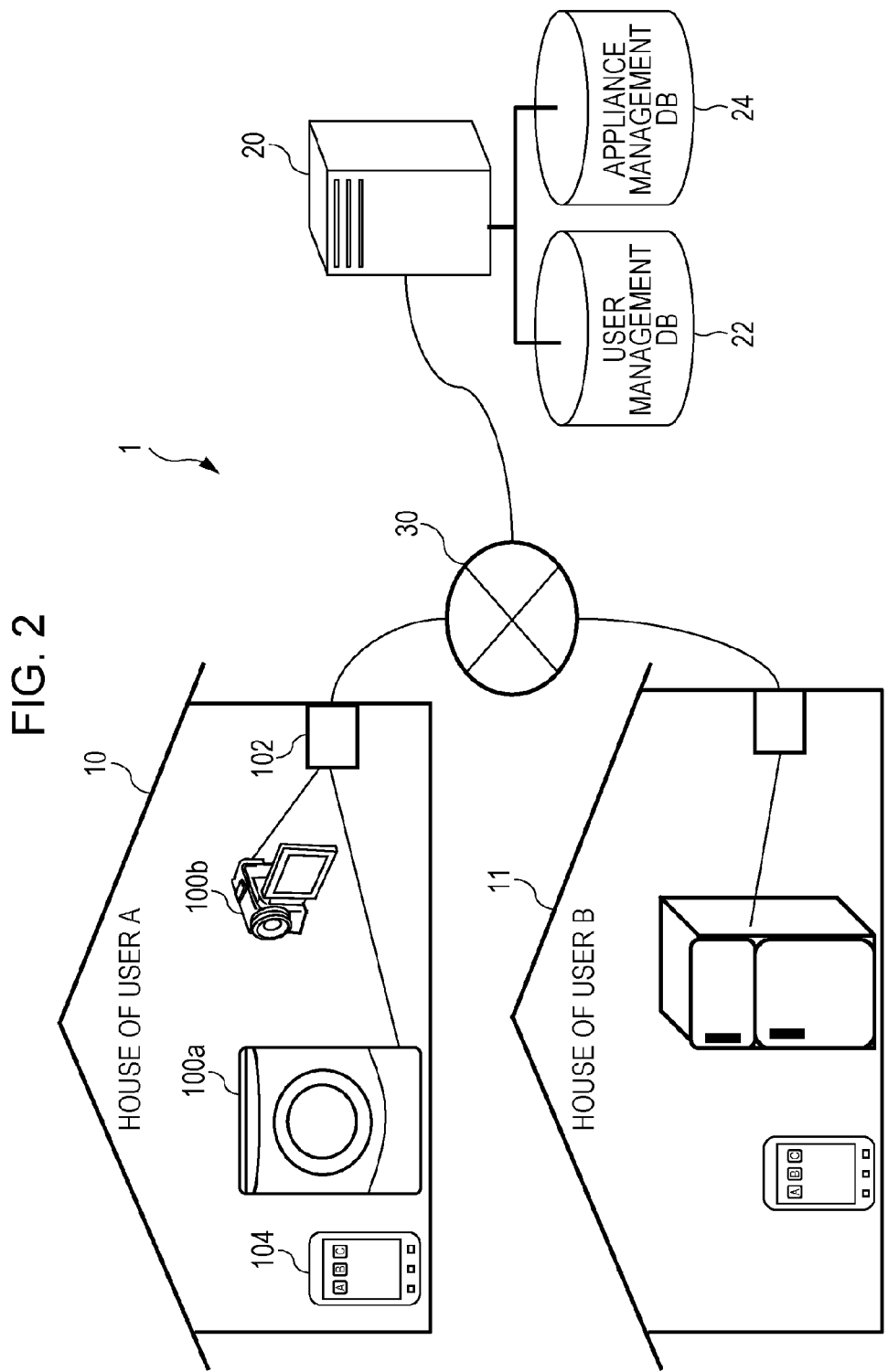
FIG. 2 illustrates the configuration of the information management system according to the exemplary embodiment in more detail.

FIG. 2 illustrates the configuration of the information management system 1 according to the present embodiment in more detail. As illustrated in FIG. 2, the management server 20 is connected to a house 10 of a user A and a house 11 of a user B via an information communication network 30 (hereinafter referred to as a "network 30"). The configuration of the house 10 of the user A is virtually the same as the configuration of the house 11 of the user B except for appliances set in the houses. The following description is made with reference to the house 10 of the user A as an example.

The management server 20 of the information management system 1 can communicate with home appliances set in the houses (e.g., the washing machine 100a) via the network 30 and the home gateway 102 installed in the house 10 of the user A. The home gateway 102 has a unique identifier assigned thereto (hereinafter also referred to as a "gateway ID (GW-ID)").

The management server 20 maintains information regarding the users in a user management database (DB) 22. According to the present embodiment, the information regarding the users is classified by each of the gateway IDs of the home gateways.

3. Example of Database Maintained in Management Server

FIG. 3 illustrates a particular example of the user management DB 22. The user management DB 22 stores, for example, a gateway ID, the identifier of a user (a user ID), personal information regarding a user (e.g., the name, the age, and the address of the user), the type of speaker model of the user, and the speech feature of the user in association with one another. The speaker model and the speech feature are described in more detail below.

In addition, the management server 20 maintains information regarding the registered appliance (the washing machine 100a) in an appliance management database (DB) 24. As in the user management DB 22, in the appliance management DB 24, the information regarding the users is classified by each of the gateway IDs of the home gateways.

FIG. 4 illustrates a particular example of the appliance management DB 24. The appliance management DB 24 stores, for example, a gateway ID, an appliance ID, the type of the appliance, a user, a disclosure policy of the log information of the appliance, the destination of the log information, and log data in association with one another.

In FIG. 4, the users are classified into the following two categories: "manager" and "non-manager". For example, a purchaser of the appliance is registered as a "manager", and a person who is not a purchaser of the appliance but uses the appliance is registered as a "non-manager". In addition, unlike a non-manager, the user registered as a manager can determine the disclosure policy of the log information and the destination of the log information.

In FIG. 4, the disclosure level (a disclosure level Lv.) is illustrated as the disclosure policy of log information. In the present specification, the amount of disclosure increases with increasing disclosure level. In the example illustrated in FIG. 4, among the appliances, that is, a TV, a cleaner, and a digital camera, the TV has the highest disclosure level. Accordingly, among the provided log information, the amount of the log information regarding the TV is the largest. Note that as illustrated in FIG. 4, an additional data item may be associated with the data items in the appliance management DB 24.

By using the user management DB 22 and the appliance management DB 24, the currently registered appliances for a given user can be identified. In addition, the speech feature of the user can be identified. As a result, when the user attempts to register a new unregistered appliance and inputs speech via the unregistered appliance, the management server 20 can determine whether any registered appliance of the user is present by using the speech feature extracted from the speech and the speech feature registered in the user management DB 22. If a registered appliance of the user is present, the disclosure policy for the registered appliance maintained in the appliance management DB 24 is applied as the disclosure policy of the unregistered appliance. Thus, registration of the unregistered appliance can be completed. However, if a registered appliance of the user is not present, the disclosure policy for a registered appliance maintained in the appliance management DB 24 for, for example, the same gateway ID is applied as the disclosure policy of the unregistered appliance. Thus, registration of the unregistered appliance can be completed.

If any registered appliance associated with the user of the appliance to be registered is not present, the management server 20 searches the appliance management DB 24 for the disclosure policy of a registered appliance of another user having the same gateway ID (in general, a family member living in the same house) and applies the disclosure policy for the registered appliance as the disclosure policy for the unregistered appliance. Thus, registration of the unregistered appliance can be completed.

In response to an access from a mobile information terminal (e.g., the information terminal 104), which is a display terminal, owned by the user A, the management server 20 verifies whether the user A is a service subscriber and authenticates the access. Thereafter, the management server 20 provides the display data of the user to the display terminal of the user. The display data is generated by the management server 20.

4. Configuration of Home Appliance

The configuration of the home appliance, the configuration of the home gateway 102, and the configuration of the management server 20 are described below with reference to FIGS. 5 to 9.

The configuration of the home appliance 100 according to the present embodiment is described first. The washing machine 100a or the video camera 100b is an example of the home appliance 100.

Figure 5:
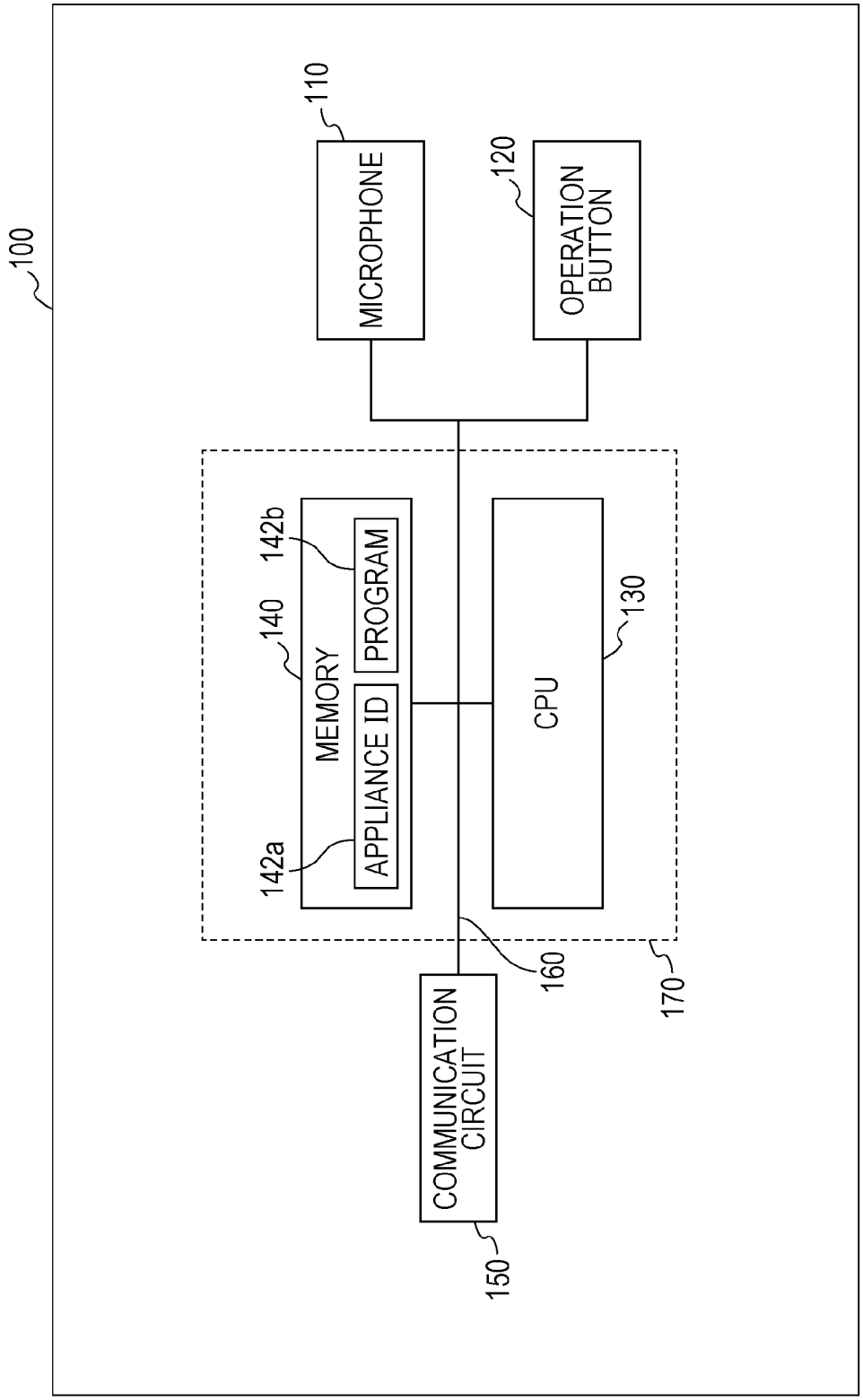
FIG. 5 illustrates the hardware configuration related to appliance registration of a home appliance.

FIG. 5 illustrates the hardware configuration related to appliance registration of the home appliance 100, which is an example of the appliance. The home appliance 100 includes a microphone 110, an operation button 120, a communication circuit 150, and a processing circuit 170. These constituent elements are connected to one another via a bus 160 and can communicate data and instructions with one another.

The microphone 110 collects user's speech, generates an analog audio signal, and converts the analog audio signal into digital data. Thereafter, the microphone 110 outputs the digital data.

The operation button 120 is a button used as, for example, a power button of the home appliance 100 and/or a button used to start an appliance registration process.

The processing circuit 170 can be achieved by combining a CPU 130 with a memory 140 storing an appliance ID 142a and a computer program 142b. Alternatively, the processing circuit 170 may be achieved by dedicated hardware configured to perform the operation described below. In addition to the illustrated constituent elements, the home appliance 100 may include a constituent element that realizes a function required for the appliance.

Note that the appliance ID 142a is an identifier uniquely assigned to the appliance. The appliance ID 142a may be assigned by the manufacturer or may be a physical address that is generally uniquely assigned to the appliance in the network (so-called MAC (Media Access Control) address).

The communication circuit 150 is a circuit to communicate with another device (e.g., the gateway 102) via the network. The communication circuit 150 establishes communication based on, for example, the Ethernet (trade name) standard. The communication circuit 150 sends log information and ID information generated by the processing circuit 170 to the gateway 102.

Figure 6:
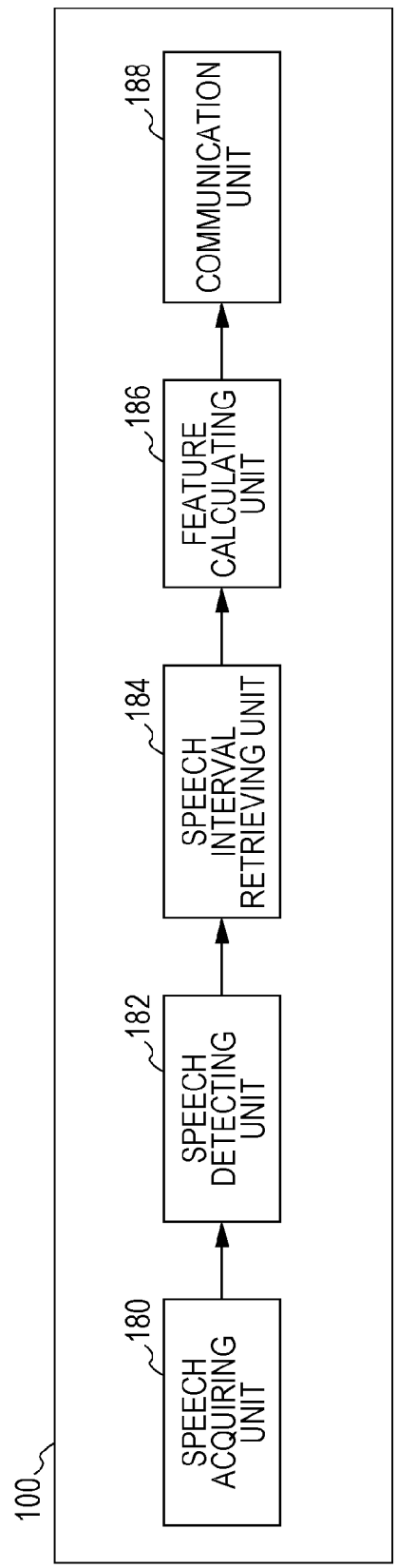
FIG. 6 illustrates the structure of functional blocks related to appliance registration of the home appliance.

FIG. 6 illustrates the structure of functional blocks of the home appliance 100 related to appliance registration. Five functional blocks realized by the microphone 110, the processing circuit 170, and the communication circuit 150 are illustrated in FIG. 6. More specifically, the home appliance 100 includes, as functions related to appliance registration, a speech acquiring unit 180, a speech detecting unit 182, a speech interval retrieving unit 184, a feature calculating unit 186, and a communication unit 188.

The speech acquiring unit 180 corresponds to the microphone 110. In addition, the communication unit 188 corresponds to the communication circuit 150.

In contrast, the speech detecting unit 182, the speech interval retrieving unit 184, and the feature calculating unit 186 are realized by the processing circuit 170. The CPU 130 executing the computer program 142b functions as, for example, the speech detecting unit 182 at a given point in time, functions as the speech interval retrieving unit 184 at another point in time, and functions as the feature calculating unit 186 at still another point in time. Note that at least one of the three constituent elements may be realized by hardware that performs a dedicated process (e.g., a DSP).

Note that particular processes performed by the speech detecting unit 182, the speech interval retrieving unit 184, and the feature calculating unit 186 are described in more detail below with reference to FIGS. 13 to 21.

5. Configuration of Gateway

Figure 7:
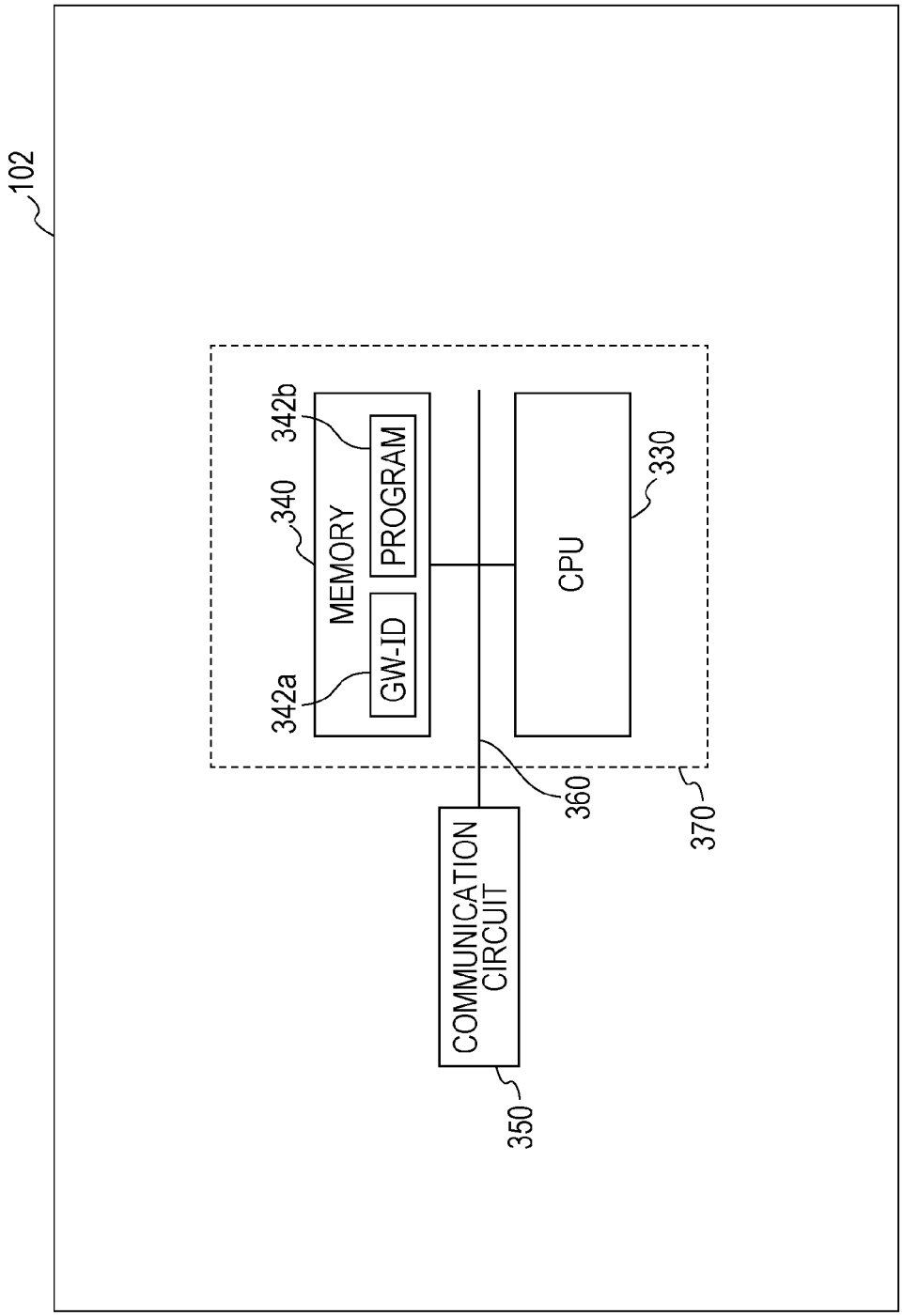
FIG. 7 illustrates the hardware configuration of a gateway.

FIG. 7 illustrates the hardware configuration of the gateway 102.

The gateway 102 includes a communication circuit 350 and a processing circuit 370. The communication circuit 350 and the processing circuit 370 are connected to each other via a bus 360 and can communicate data and instructions with each other.

The processing circuit 370 can be achieved by combining a CPU 330 with a memory 340 storing a uniquely identifiable gateway ID 342a and a computer program 342b. Alternatively, the processing circuit 370 may be achieved by dedicated hardware configured to perform the operation described below. In addition to the illustrated constituent elements, the gateway 102 may include a constituent element that realizes a function required for the appliance.

Note that in FIG. 7, the memory 340 that stores the computer program 342b also stores the gateway ID 342a. However, this is only an example. The computer program 342b may be stored in a RAM or a ROM, and the gateway ID 342a may be stored in a flash memory.

6. Configuration of Management Server

Figure 8:
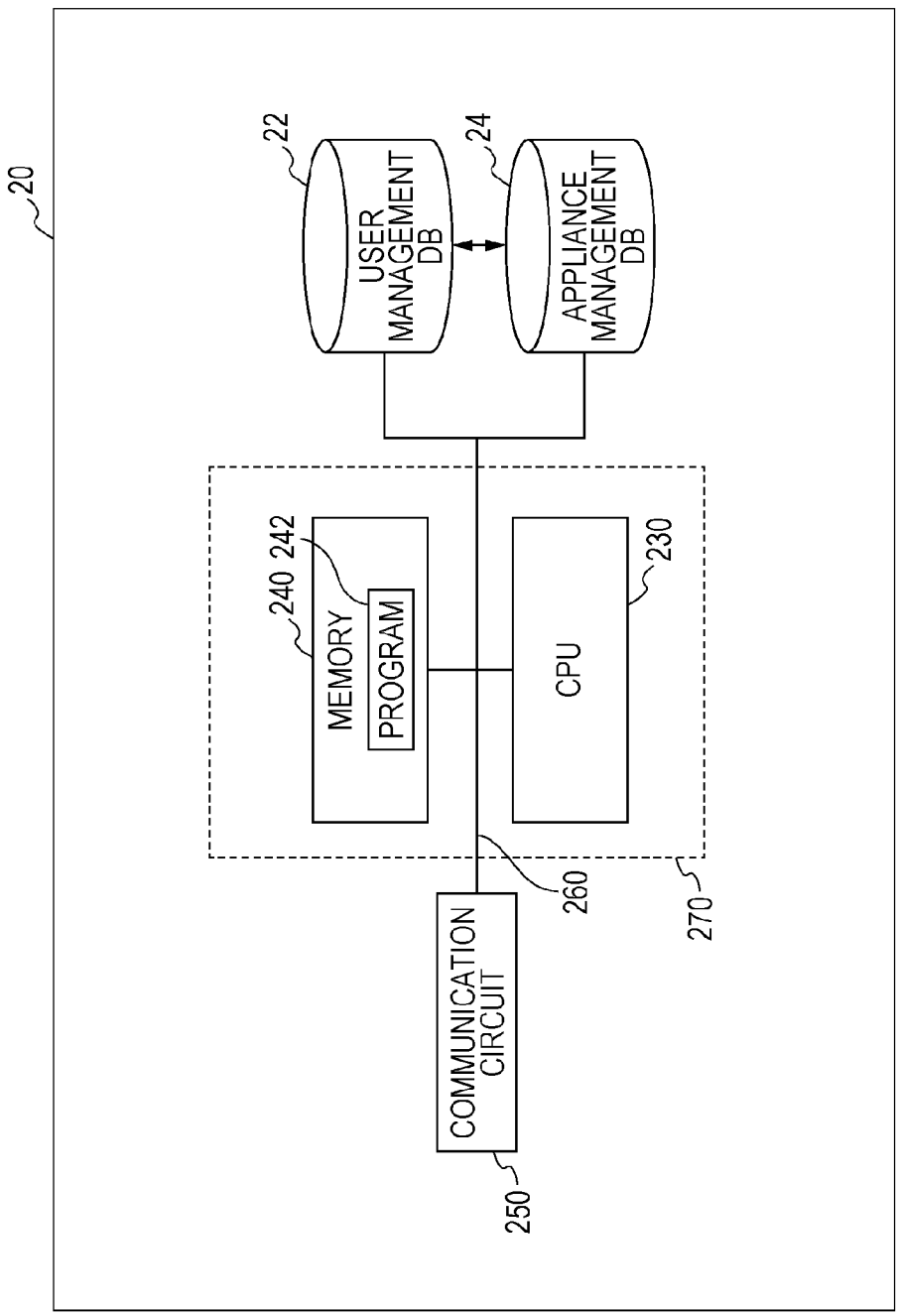
FIG. 8 illustrates the hardware configuration of a management server.

FIG. 8 illustrates the hardware configuration of the management server 20. The management server 20 includes a communication circuit 250, a processing circuit 270, the user management DB 22, and the appliance management DB 24.

The processing circuit 270 includes a CPU 230 and a memory 240 storing a program 242. These constituent elements are connected to each other by a bus 260 and can communicate data with each other.

The processing circuit 270 is connected to the user management DB 22 and the appliance management DB 24 and can retrieve and edit management information stored in the user management DB 22 and the appliance management DB 24. Note that according to the present embodiment, the user management DB 22 and the appliance management DB 24 are internal elements of the management server 20. However, the user management DB 22 and the appliance management DB 24 may be disposed outside the management server 20. In such a case, instead of the bus 260, the Internet network can be included.

The communication circuit 250 is a circuit that communicates with another communication device (e.g., the gateway 102) via a network. The communication circuit 250 establishes communication based on, for example, the Ethernet (trade name) standard.

The CPU 230 controls the operation performed by the management server 20. The CPU 230 executes instructions set forth in the computer program 242 loaded into the memory 240. In this manner, the CPU 230 can realize a variety of functions. The computer program 242 has instructions set forth therein for realizing the operations performed by the management server 20 described below.

The above-described program 242 can be recorded in a recording medium, such as a CD-ROM. Thereafter, the program 242 can be distributed to the market in the form of a product or be transmitted via an electric communication network, such as the Internet. By reading in the computer program 242, a device having the hardware illustrated in FIG. 8 (e.g., a PC) can function as the management server 20 according to the present embodiment.

Note that the CPU 230 and the memory 240 storing the computer program 242 may be realized by hardware such as a DSP (Digital Signal Processor) that integrates a computer program into a single semiconductor circuit. Such a DSP can provide, using a single integrated circuit, all the processes performed by the CPU 230 that executes the computer program 242. Instead of the CPU 230 and the memory 240 illustrated in FIG. 8, such a DSP may be employed as the processing circuit 270.

Figure 9:
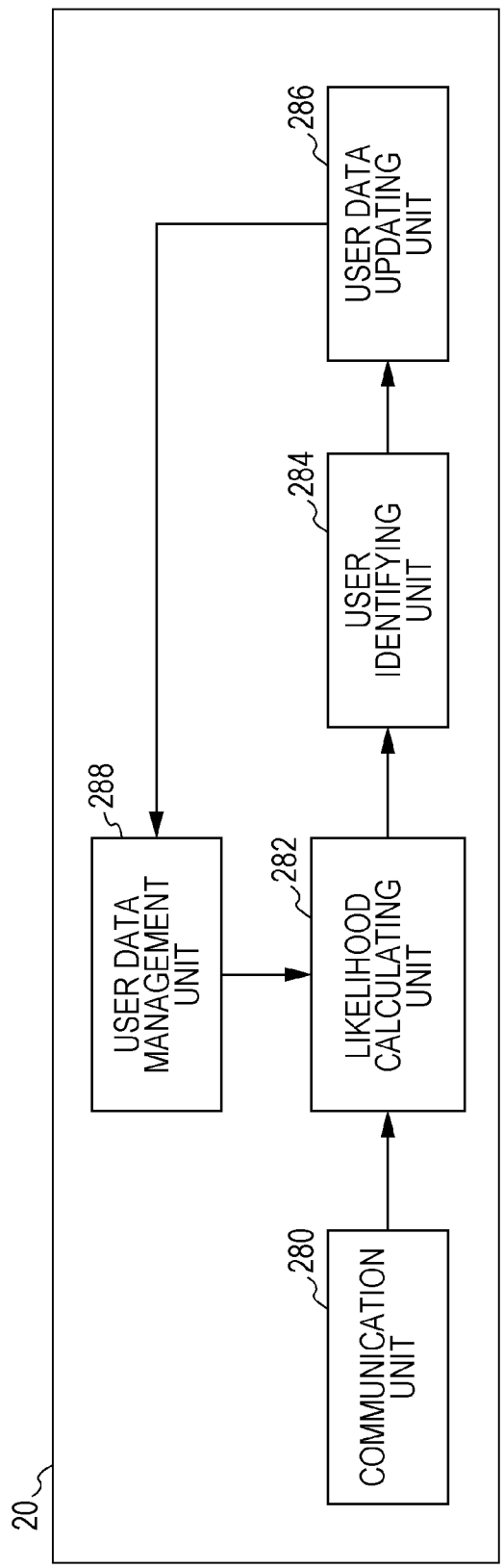
FIG. 9 illustrates the structure of the functional blocks of the management server.

FIG. 9 illustrates the structure of the functional blocks of the management server 20. Five functional blocks of the management server 20 that are realized by the processing circuit 270 and the communication circuit 250 are illustrated in FIG. 9. More specifically, the management server 20 includes, as functions related to appliance registration, a communication unit 280, a likelihood calculating unit 282, a user identifying unit 284, a user data updating unit 286, and a user data management unit 288.

The communication unit 280 corresponds to the communication circuit 250.

In contrast, the likelihood calculating unit 282, the user identifying unit 284, the user data updating unit 286, and the user data management unit 288 are realized by the processing circuit 270. The CPU 230 that executes the computer program 242 functions as, for example, the likelihood calculating unit 282 at a given point in time, functions as the user identifying unit 284 at another point in time, and functions as the user data updating unit 286 or the user data management unit 288 at still another point in time. Note that at least one of the four constituent elements may be realized by hardware that performs a dedicated process (e.g., a DSP).

Note that particular processes performed by the likelihood calculating unit 282, the user identifying unit 284, the user data updating unit 286, and the user data management unit 288 are described in more detail below.

7. Pre-Communication Between Display Terminal and Gateway

Figure 10:
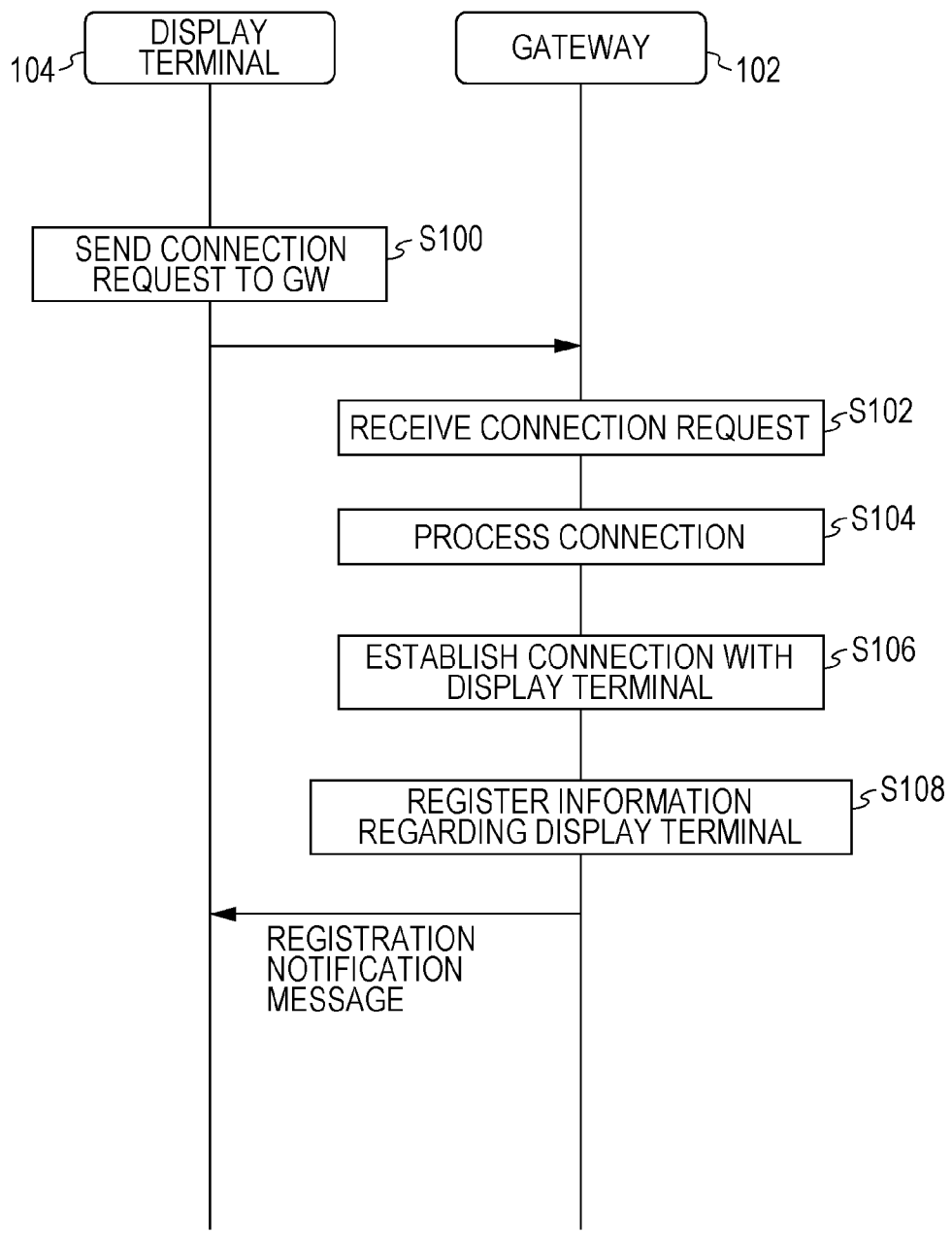
FIG. 10 illustrates a sequence of communication processes performed between a display terminal 104 and the gateway.

FIG. 10 illustrates a sequence of communication processes performed between the display terminal 104 and the gateway 102. This process is performed prior to registration of an appliance described below.

In step S100, the display terminal 104 sends a connection request to the gateway 102 first. Thereafter, in step S102, the gateway 102 receives the request. In step S104, the gateway 102 performs a process required for establishing connection in accordance with a predetermined communication protocol. In step S106, communication with the display terminal 104 is established. When establishing the communication, the gateway 102 acquires, for example, information indicating the network address of the display terminal 104 (the address information) and the appliance ID and stores the acquired information in the memory 340 thereof (FIG. 7). Note that the term "address information" refers to a unique address of network assigned to the display terminal 104 statically or dynamically. In addition, as described above, the appliance ID may be a unique value given by the manufacturer or may be a physical address that is generally uniquely assigned to the appliance in the network (so-called MAC (Media Access Control) address).

Subsequently, the gateway 102 sends, to the display terminal 104, a message indicating that the address information regarding the display terminal 104 is registered. Upon receiving the message, the display terminal 104 displays, for example, the message "Registration of the terminal is completed." on the display. In this manner, the user can be aware that the display terminal 104 is registered in the gateway 102.

Through the above-described process, the user can receive, for example, a service provided via the gateway 102 and using the log information regarding a home appliance by using the display terminal 104.

8. Appliance Registration Process at Initial Registration Conducted by User

Figure 11:
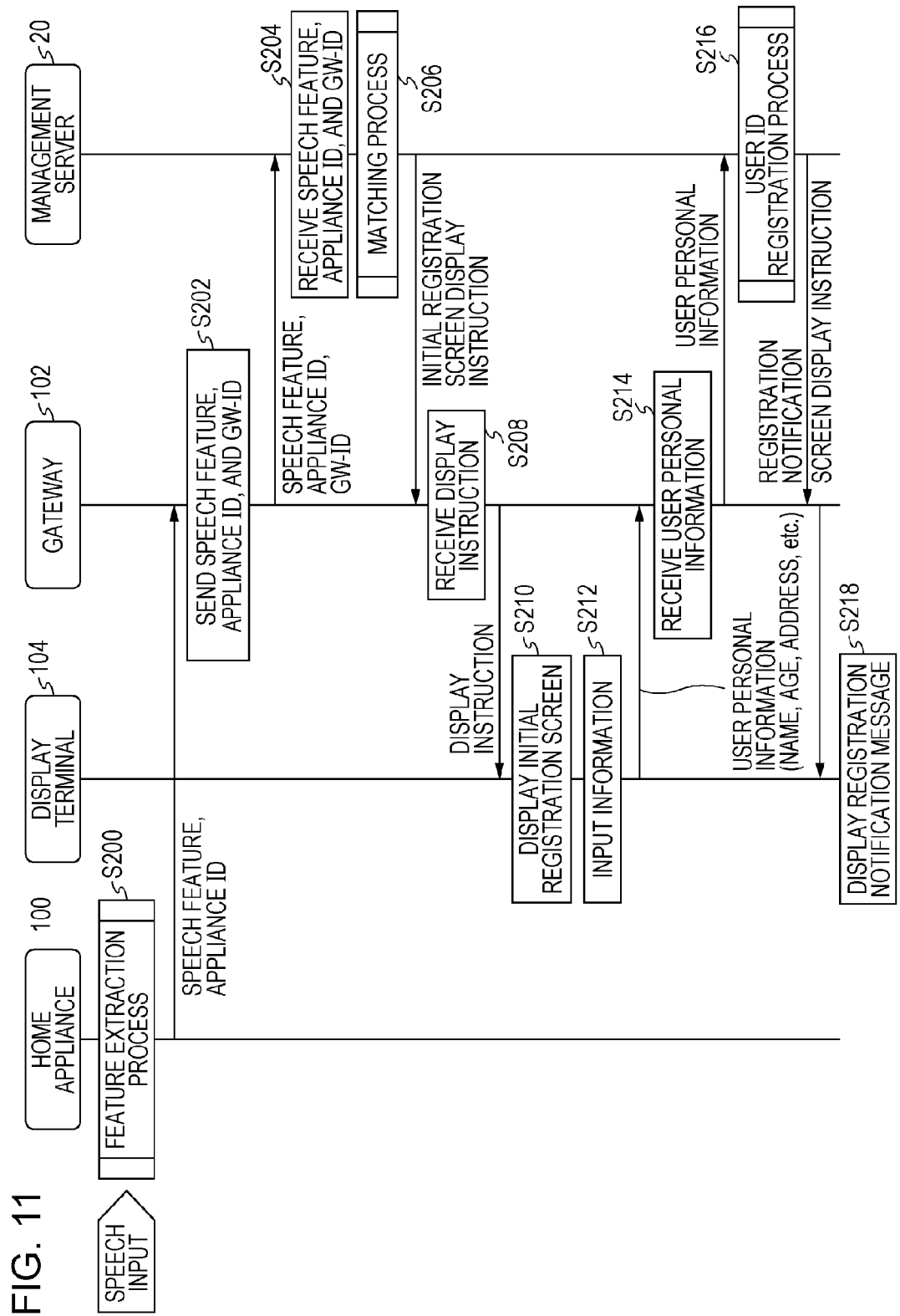
FIG. 11 illustrates a sequence of communication processes performed when a user registers user information (e.g., personal information) for the first time.

FIG. 11 illustrates a sequence of communication processes performed when the user registers user information (e.g., personal information) for the first time. Note that this sequence starts when the operation button 120 is pressed and, thus, the home appliance 100 is powered on for the first time or when the user instructs the home appliance 100 to start a registration process.

In step S200, the home appliance 100 performs a feature extraction process and obtains the speech feature. The feature extraction process is illustrated in detail in FIGS. 15 to 19. The feature extraction process is described in detail below. The communication circuit 150 of the home appliance 100 sends, to the gateway 102, the acquired speech feature and the appliance ID 142a stored in the memory 140. The gateway 102 receives the speech feature and the appliance ID 142a.

In step S202, the gateway 102 sends, to the management server 20, the gateway ID 342a stored in the memory 340 thereof together with the speech feature and the appliance ID received from the home appliance 100.

Figure 20:
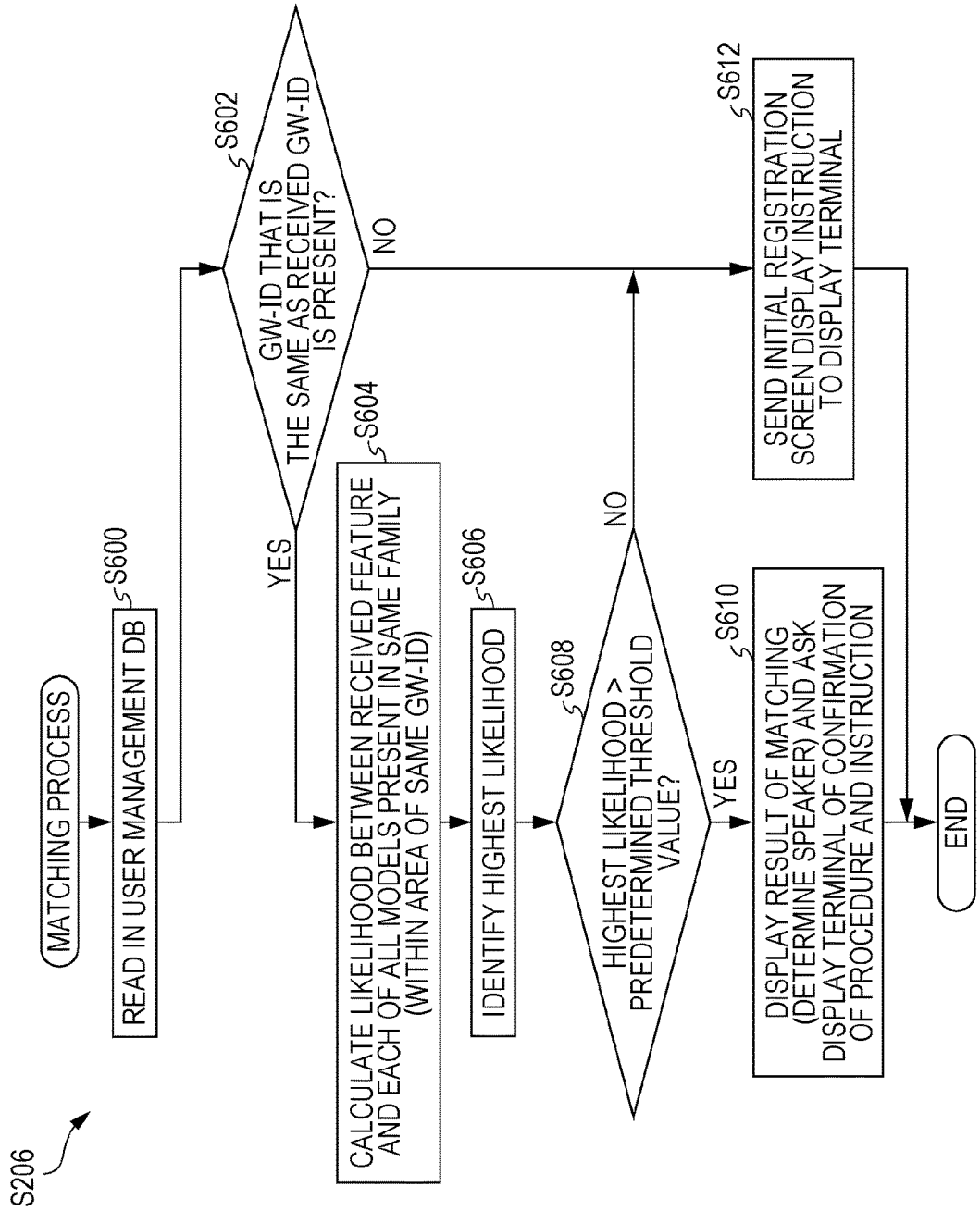
FIG. 20 is a flowchart illustrating the procedure for a user matching process.

In step S204, the management server 20 receives the speech feature, the appliance ID, and the gateway ID. In step S206, the management server 20 performs a matching process. In the matching process, it is checked whether the user of the home appliance 100 is registered in the user management DB 22 of the management server 20. According to the present embodiment, the management server 20 maintains the speech feature information regarding a user registered in the user management DB 22. If the user input their speech into an unregistered appliance in order to register the new appliance (the unregistered appliance), a feature is extracted from the speech of the user by the appliance. The CPU 230 of the management server 20 receives data of the speech feature and compares the received speech feature with the speech feature of a user maintained in the user management DB 22. In this manner, the management server 20 identifies the speaker. The details of the matching process are illustrated in FIG. 20 and are described below.

In this example, it is assumed that the user registers the personal information of the user for the first time and an unregistered appliance is registered for the first time. Accordingly, the user information is not yet registered with the user management DB 22. Thus, the CPU 230 of the management server 20 sends, to the gateway 102, an instruction to display a screen (a window) for initial registration via the communication circuit 250.

In step S208, the communication circuit 350 of the gateway 102 receives a screen display instruction. The CPU 330 of the gateway 102 outputs a display instruction to the address of the display terminal 104 registered through the sequence illustrated in FIG. 4.

In step S210, the display terminal 104 displays an initial registration screen on the basis of the display instruction. For example, FIG. 12 illustrates an example of the initial registration screen displayed on the display of the display terminal 104.

In step S212, the input information regarding the user is received. The information includes, for example, the name, the gender, the age, the address, and the mail address of the user. According to the present embodiment, since a plurality of users in the same family are managed by the same gateway ID, the relationship information in a family structure (e.g., father, mother, and son) is also input as the information regarding the user. The display terminal 104 sends the information regarding the user to the gateway 102.

In step S214, the gateway 102 receives the user personal information and forwards the received information to the management server 20.

In step S216, if the communication circuit 250 of the management server 20 receives the user personal information, the CPU 230 issues a user ID and registers the user ID in the user management DB 22 in association with the user personal information. Upon completion of the registration, the CPU 230 sends, to the gateway 102, a notification screen display instruction that notifies the user of that information. The instruction is forwarded from the gateway 102 to the display terminal 104.

In step S218, the display terminal 104 displays the registration notification screen. Displaying of the screen allows the user to be aware that the speech feature and the user personal information of the user have been registered. As a result, the user management DB 22 illustrated in FIG. 3 is updated.

9. General Idea of Speaker Identification Process

The general idea of processing related to a speech feature used to identify the speaker according to the present embodiment is described next with reference to FIGS. 13 and 14. For ease of understanding, an example of a relevant waveform is illustrated in the right of each step. Note that a method for identifying a speaker described below is only an example. Another method may be employed to identify the speaker.

FIG. 13 is a flowchart illustrating the procedure for a process for creating a speaker model from learning data. According to the present embodiment, the processes in steps S300 and S302 are performed by the home appliance 100, and the process in step S304 is performed by the CPU 230 of the management server 20.

In step S300, the CPU 130 obtains the speech data of the user generated by the microphone 110. Note that at that time, the CPU 130 functions as the feature calculating unit 186 illustrated in FIG. 6.

Subsequently, in step S302, the CPU 130 calculates the feature. As a feature used to identify a speaker, Mel Frequency Cepstrum Coefficient (MFCC), which is widely used in speech recognition technology, is employed. More specifically, the CPU 130 frequency-converts the speech data to obtain the amplitude spectrum. Thereafter, the CPU 130 applies a Mel filter bank to the amplitude spectrum while taking into account the human frequency perception characteristics. Thereafter, the CPU 130 performs cepstrum analysis and extracts an articulatory filter component of the speech.

In step S304, the CPU 230 of the management server 20 generates a model for identification from the obtained feature. A variety of model learning methods for identifying a speaker are available. According to the present embodiment, a model for identification is generated using a Gaussian mixture model (GMM). More specifically, the feature (MFCC) data group of a certain speaker is used as an input parameter, and learning is performed using an EM algorithm. In this manner, the characteristics of speech of the speaker is expressed as a linear superposition of Gaussian distribution. The data expressed as the linear superposition are used as the model for identification. The model obtained in this manner is stored in the user management DB 22 illustrated in FIG. 3 as a speaker model.

FIG. 14 is a flowchart illustrating the procedure for the process for identifying a speaker. In this process, the speech feature of a certain user is applied to each of a plurality of speaker models for identification, and the likelihood (a probability rating scale) is calculated. The likelihood (the log likelihood) is the probability of data Φ when an input x is provided, and is expressed as follows:

$$L(\Phi) = \log p(x|\Phi), \Phi = [\theta_1 \ldots \theta_N]^T$$

According to the present embodiment, this process is performed by the CPU 230 of the management server 20. To perform the process illustrated in FIG. 14, the user management DB 22 maintains a speaker model generated from the speech feature of at least one user. According to the present embodiment, for example, a "speaker model" in the user management DB 22 illustrated in FIG. 3 corresponds to such a model. In addition, a "feature" in FIG. 3 corresponds to the speech feature used for learning of a speaker model. In FIG. 3, a data file name given to data serving as the entity is illustrated.

In step S400, the CPU 230 obtains the speech feature (the MFCC) of the user. In step S402, the CPU 230 applies the obtained speech feature through each of a plurality of speaker models and calculates the likelihood for the speaker model.

In step S404, the CPU 230 identifies the speaker of the model having the highest likelihood as the speaker of the input speech.

10. Feature Extraction Process Performed by Home Appliance

FIG. 15 is a flowchart illustrating the procedure for the feature extraction process. This process is a detailed process performed in step S200 in FIG. 11. That is, this process is performed by the home appliance 100. Descriptions of the process are made with reference to FIGS. 16 to 19 as needed.

Figure 16:
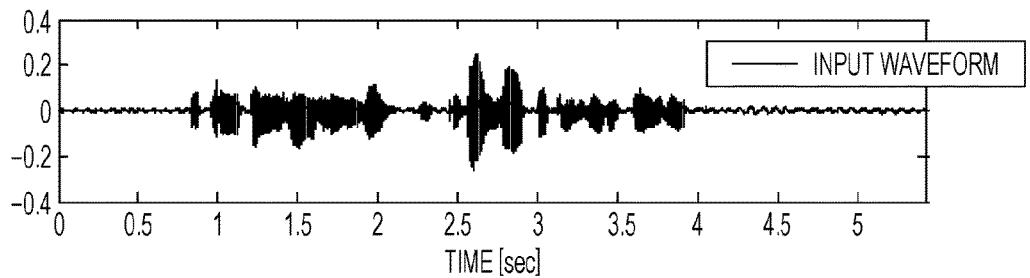
FIG. 16 illustrates an example of a speech waveform acquired by a speech acquiring unit 180 and detected by the speech detecting unit.

In step S500, the speech acquiring unit 180 (FIG. 6) starts an operation to detect speech. In step S502, the speech detecting unit 182 determines whether speech is detected. If, for example, the level of detected speech is lower than or equal to a predetermined value, the speech detecting unit 182 determines that speech is not detected, and the processing proceeds to step S504. However, if the level of detected speech is higher than the predetermined value, the speech detecting unit 182 determines that speech is detected, and the processing proceeds to step S506. FIG. 16 illustrates an example of a speech waveform acquired by the speech acquiring unit 180 and detected by the speech detecting unit 182.

In step S504, the speech detecting unit 182 instructs the speech acquiring unit 180 to receive the input speech again. The processes in steps S500 to S504 are repeatedly performed until speech is detected.

Figure 17:
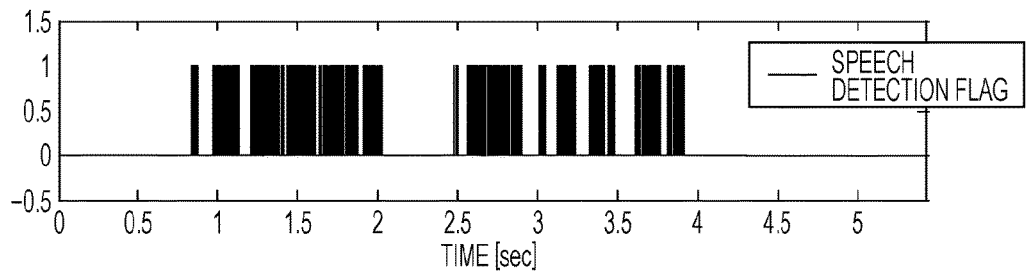
FIG. 17 illustrates a speech detection flag generated by a speech interval retrieving unit.
Figure 18:
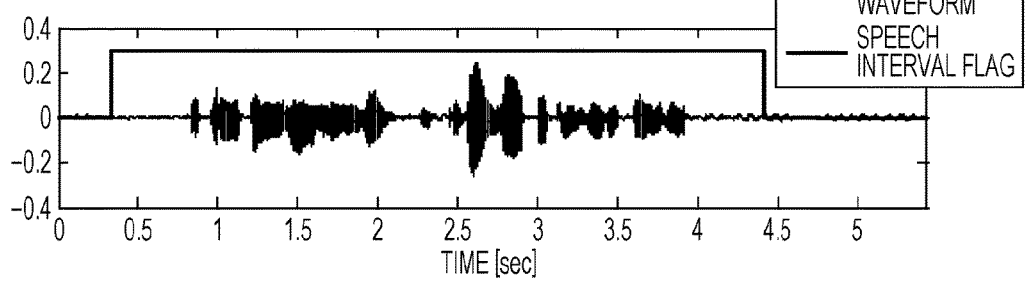
FIG. 18 illustrates a speech interval identified by the speech interval retrieving unit.

In step S506, the speech interval retrieving unit 184 detects a speech interval that is present in the received speech signal. For example, FIG. 17 illustrates a speech detection flag generated by the speech interval retrieving unit 184. At a point in time when the amplitude of a speech waveform exceeds a predetermined threshold value, the speech detection flag "1" is set. In contrast, at a point in time when the amplitude of a speech waveform is less than or equal to the predetermined threshold value, the speech detection flag "0" is set. In this manner, the speech interval retrieving unit 184 can clearly identify an utterance interval. FIG. 18 illustrates a speech interval identified by the speech interval retrieving unit 184. As illustrated in FIG. 18, an interval starting at 0.3 seconds and ending at 4.4 seconds from start of speech detection is identified as a speech interval. Note that according to the present embodiment, the speech interval is detected so as to have a margin before and after the utterance interval. The speech interval retrieving unit 184 retrieves a speech signal from the identified speech interval.

Figure 19:
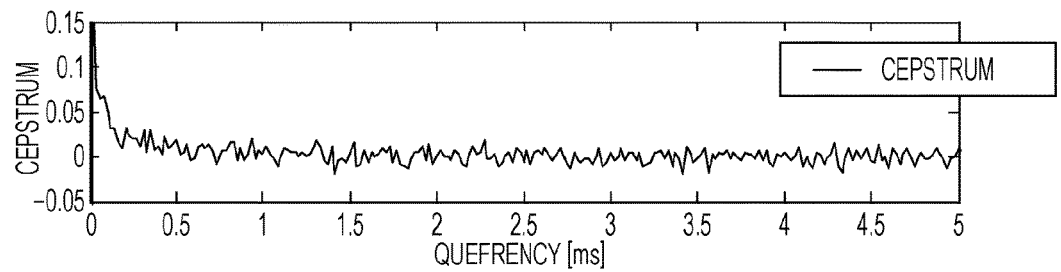
FIG. 19 illustrates an example of a calculated MFCC.

In step S508, the feature calculating unit 186 calculates the Mel Frequency Cepstrum Coefficient (MFCC) on the basis of the retrieved speech signal. FIG. 19 illustrates an example of the calculated MFCC. In FIG. 19, the ordinate represents a cepstrum value, and the abscissa represents a quefrency (ms).

Through the above-described processes, the MFCC can be calculated from the input speech by the home appliance 100.

11. User Matching Process Performed by Management Server

FIG. 20 is a flowchart illustrating the procedure for the user matching process. This process is a detailed process performed in step S206 in FIG. 11. That is, this process is performed by the management server 20.

In step S600, the CPU 230 reads in the user management DB 22. In the subsequent step S602, the CPU 230 determines whether a gateway ID that is the same as the received gateway ID is present in the user management DB 22. If such a gateway ID is present, the processing proceeds to step S604. However, if such a gateway ID is not present, it can be determined that the user has not yet been registered. Accordingly, the processing proceeds to step S612.

In step S604, the CPU 230 calculates the likelihood between the received feature and each of all the speaker models present in the same family (within the area of the same gateway ID). In step S606, the CPU 230 detects a user having the highest likelihood among the obtained likelihoods. If, for example, only one speaker model is present within the area of the same gateway ID, the likelihood of the speaker model can be considered as the highest likelihood.

Figure 21:
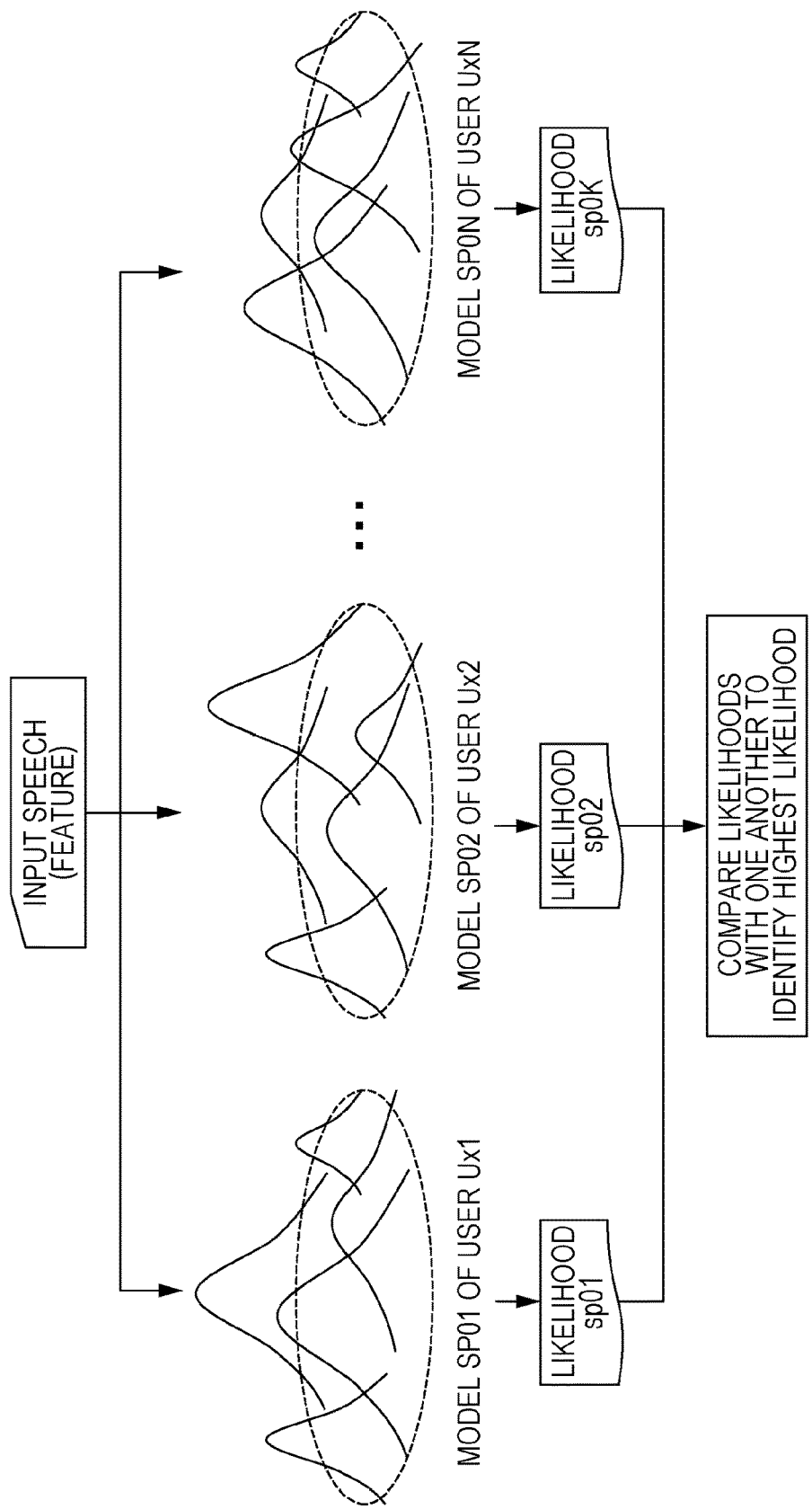
FIG. 21 illustrates the general idea of a process to calculate the likelihood by applying the feature of input speech to the speaker model of each of users.

The processes performed in steps S604 and S606 are schematically illustrated in FIG. 21. FIG. 21 illustrates the general idea of a process to calculate the likelihood by applying the feature of the input speech to the speaker model of each of the users. For example, let N users who are associated with the same gateway ID be present in the user management DB 22. Then, by applying the speech feature of the user who inputs speech to a speaker model SP0K of a user having a user ID of Uxk, a likelihood sp0K can be obtained (k: an integer between 1 and N). The CPU 230 can compare the obtained likelihoods with one another and select the highest likelihood from among the obtained likelihoods.

Referring back to FIG. 20, in step S608, the CPU 230 determines whether the highest likelihood is greater than a predetermined threshold value. If the highest likelihood is greater than the predetermined threshold value, the processing proceeds to step S610. However, if the highest likelihood is less than or equal to the predetermined threshold value, the processing proceeds to step S612.

In step S610, the CPU 230 determines that the speaker who utters is a speaker of the model that provides the highest likelihood and instructs the display terminal 104 to display that information as the result of matching. Thereafter, a confirmation message for confirming the procedure required for the subsequent processing and instructions are sent to the display terminal 104 and are displayed on the display terminal 104.

In step S612, the CPU 230 sends an initial registration screen display instruction to the display terminal 104 via the gateway 102. Thereafter, the process in step S206 (FIG. 11) is completed.

12. User ID Registration Process Performed by Management Server

Figure 22:
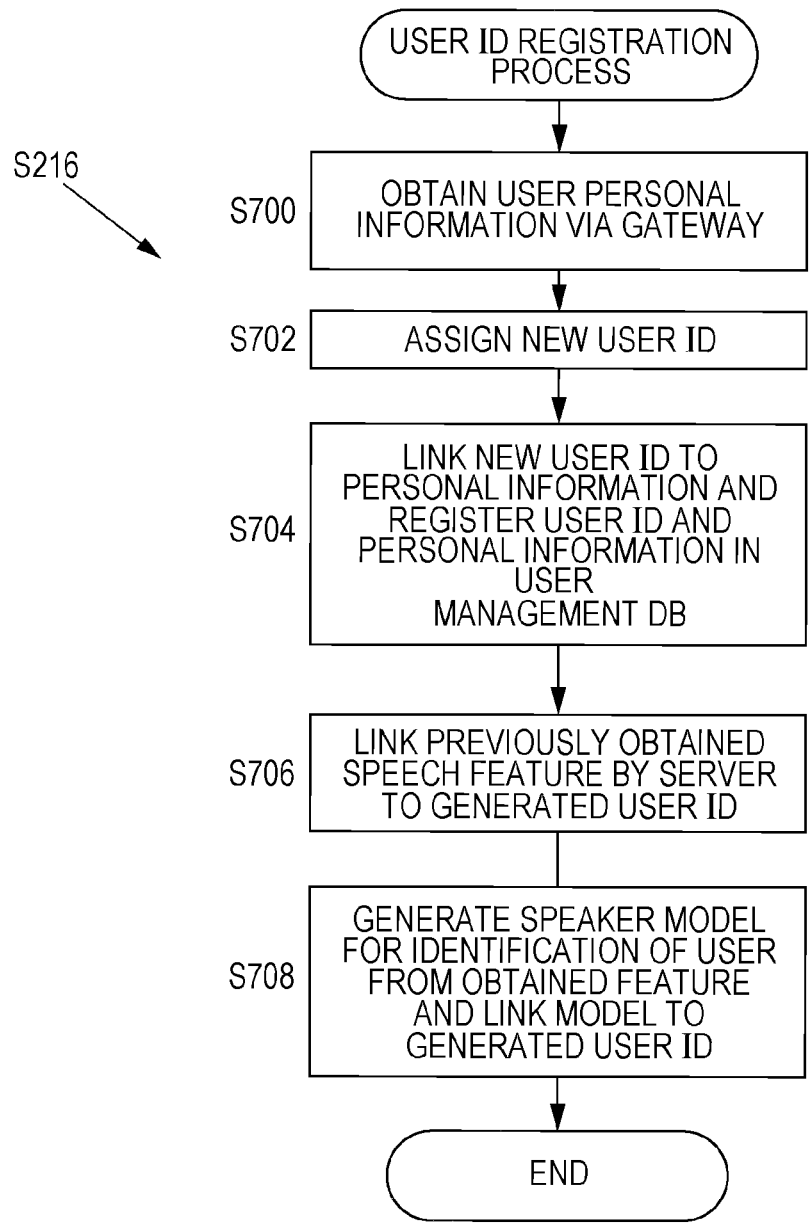
FIG. 22 is a flowchart illustrating the procedure for a user ID registration process.

FIG. 22 is a flowchart illustrating the procedure for the user ID registration process. This process is a detailed process performed in step S216 in FIG. 11. That is, this process is performed by the management server 20.

In step S700, the CPU 230 of the management server 20 acquires the user personal information from the user via the gateway 102.

In step S702, the CPU 230 assigns a new user ID to the user. The CPU 230 may assign the user ID in accordance with any predetermined rule. Alternatively, the CPU 230 may assign a user ID specified by the user. In either case, the user ID is not double assigned.

In step S704, the CPU 230 links (associates) the new user ID to the user personal information and registers the user ID and the user personal information in the user management DB 22. In addition, in step S706, the CPU 230 links the new user ID to the previously obtained speech feature of the user and registers the user ID and the speech feature in the user management DB 22.

In step S708, the CPU 230 generates a speaker model for identification of the user from the obtained speech feature and further links the new user ID to the generated speaker model for identification and registers the user ID and the speaker model for identification in the user management DB 22.

Through the above-described processes, the user ID is associated with the speech feature and the speaker model for identification in addition to the user personal information and is maintained in the user management DB 22.

Figure 23:
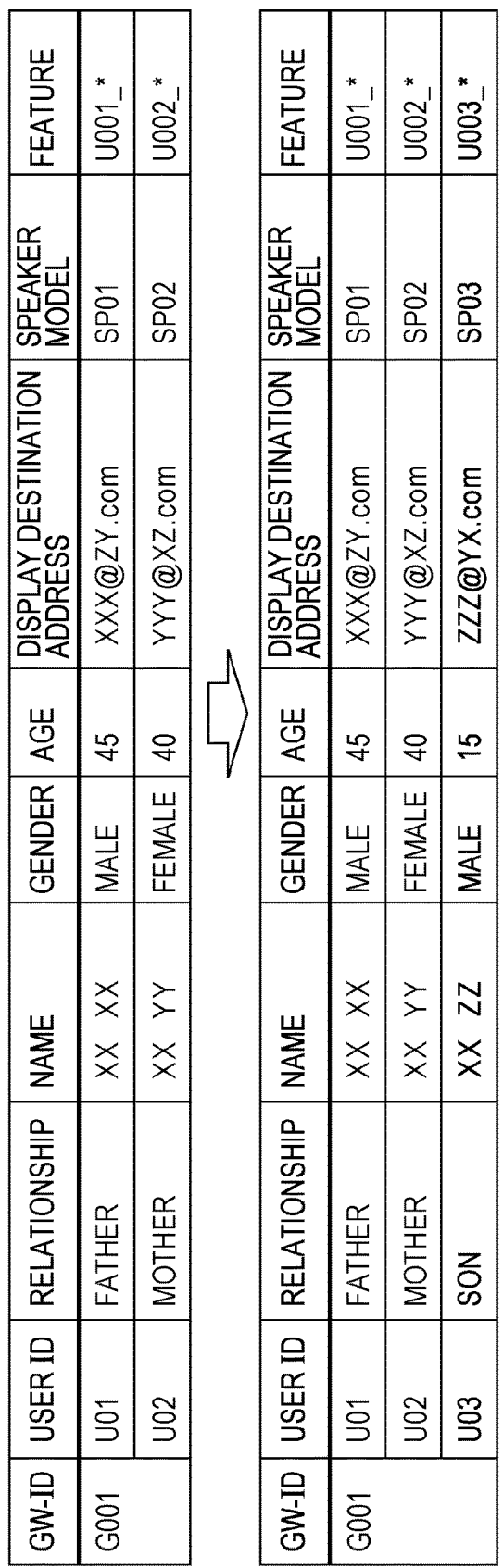
FIG. 23 illustrates a change in data when a new user is added to the user management DB.

FIG. 23 illustrates a change in data when a new user is registered with the user management DB 22.

As illustrated in the upper section of FIG. 23, a family having a GW-ID of "G001" has been registered in the user management DB 22. At that time, a son of a family having the same GW-ID assigned thereto accesses the appliance management DB 24 using a home appliance 100.

As illustrated in the lower section of FIG. 23, through the above-described processes, a son who is registered for the first time is assigned a new user ID of "U03", and the user personal information, the speech feature obtained from the speech input using the home appliance 100, and the generated speaker model are associated with the user ID.

13. Appliance Registration Process Performed by Management Server (with User ID Registered)

Figure 24:
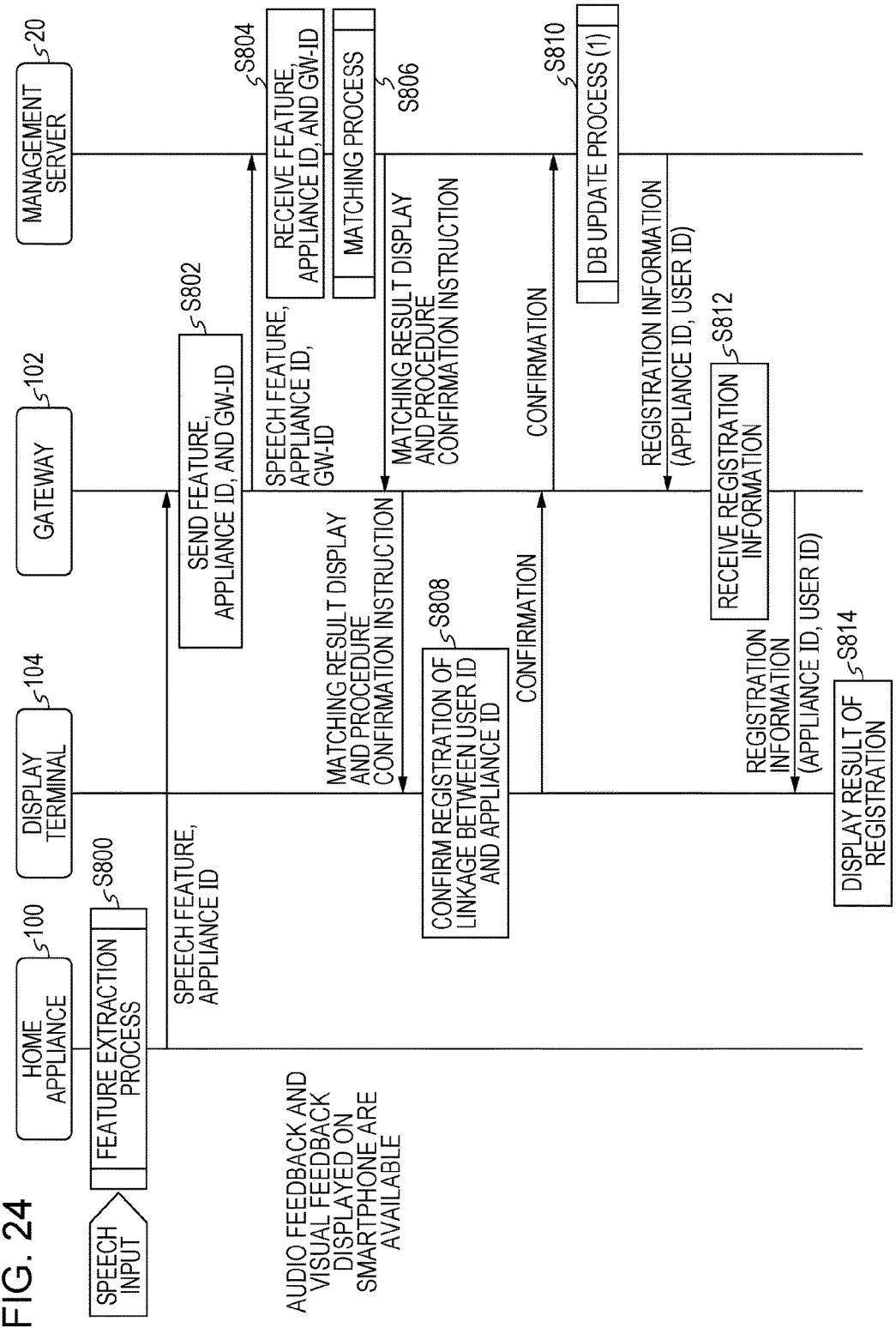
FIG. 24 illustrates the sequence of a communication process performed when an unregistered appliance is registered with the user ID registered.

FIG. 24 illustrates the sequence of communication processes performed when an unregistered appliance is registered when the user ID has already registered. This process is further performed after, for example, the user ID registration process (FIG. 11) is completed. Alternatively, this process is started by a user who has already completed the user ID registration process (FIG. 11) operating the operation button 120 of a newly purchased home appliance 100.

The CPU 230 (FIG. 8) of the management server 20 refers to the user management DB 22 using the gateway ID received from the gateway and determines whether a user associated with the gateway ID is present in the user management DB 22.

The processes in steps S800 to S806 are the same as those in steps S200 to S206 of FIG. 11, respectively. Accordingly, descriptions of the processes in steps S800 to S806 are not repeated.

Note that the detailed process in step S806 differs from the detailed process in step S206 of FIG. 11. That is, in the example illustrated in FIG. 11, the CPU 230 submits the initial registration screen display instruction through step S612 (FIG. 20). In contrast, in the example illustrated in FIG. 24, it is determined that the speaker is a registered user in step S610 (FIG. 20) and, subsequently, confirmation of the following procedure and instructions is asked using the display terminal.

Figure 25:
FIG. 25 illustrates an example of a screen displayed on the display terminal, asking the user whether the user is an identified speaker and whether the subsequent process is performed after the user is determined to be a registered user on the basis of the speech of the user.

FIG. 25 illustrates an example of a screen displayed on the display terminal 104, asking the user whether the user is an identified speaker and whether the subsequent process is performed after the user is determined to be a registered user on the basis of the speech of the user. Such a screen is displayed, and the user accepts that the subsequent process is performed by selecting "YES" in the screen.

Referring back to FIG. 24, in step S808, the display terminal 104 displays, on the display, a confirmation screen used to register linkage in accordance with the instruction sent from the management server 20. After the user confirms the confirmation screen, a message indicating the confirmation is sent to the management server 20.

In step S810, the CPU 230 of the management server 20 performs a process to update the user management DB 22. This process is described in more detail below with reference to FIG. 26. As a result of the process, the CPU 230 sends registration information regarding the registration to the gateway 102.

In step S812, the gateway 102 receives the registration information and forwards the received registration information to the display terminal 104. In step S814, the display terminal 104 displays the result of registration.

The need for the above-described processes performed in steps S800 and S802 can be eliminated. For example, if after completing the user ID registration process (FIG. 11), the user continuously performs the process illustrated in FIG. 24, the management server 20 already maintains information regarding the speech feature, the appliance ID, and the analog audio signal. Accordingly, the processing may start from the process in step S804 using the maintained information.

14. Process (1) to Update User Management DB Performed by Management Server

Figure 26:
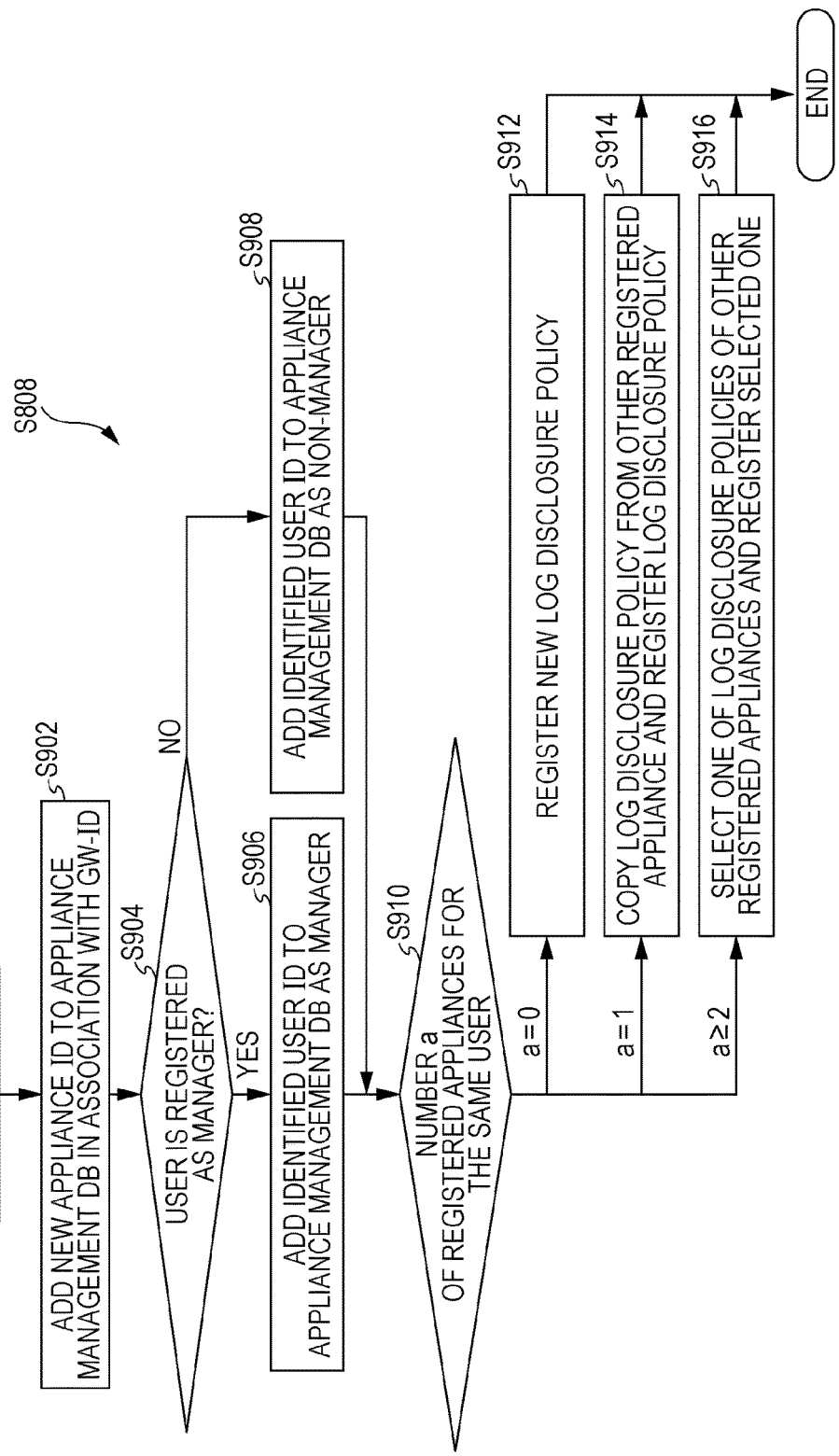
FIG. 26 is a flowchart illustrating the procedure for a process performed to update the user management DB by the management server.

FIG. 26 is a flowchart illustrating the procedure for a process to update the user management DB 22 performed by the management server 20. This process is a detailed process performed in step S808 in FIG. 24. That is, this process is performed by the management server 20.

In step S900, the CPU 230 of the management server 20 reads in the appliance management DB 24. In step S902, the CPU 230 adds, to the appliance management DB 24, an entry for the appliance ID of the new appliance in association with the registered gateway ID.

In step S904, the CPU 230 receives, from the user, an instruction as to whether the user is to be registered as a manager. If the user is to be registered as a manager, the processing proceeds to step S906. However, if the user is to be registered as a non-manager, the processing proceeds to step S908.

In step S906, the CPU 230 updates the appliance management DB 24 so that the identified user ID indicates a manager. In contrast, in step S908, the CPU 230 updates the appliance management DB 24 so that the identified user ID indicates a non-manager.

In step S910 and the subsequent steps, a process to register the disclosure policy of log information of a newly registered home appliance 100 is performed.

In step S910, the CPU 230 refers to the appliance management DB 24 and identifies the number of registered appliance a for the same user.

If a registered appliance is not present (a=0), the processing proceeds to step S912, where the CPU 230 registers the log disclosure policy by receiving an instruction from the user or registers a pre-specified log disclosure policy.

If the number of registered appliance is one (a=1), the processing proceeds to step S914, where the CPU 230 copies the log disclosure policy of another registered appliance and registers the log disclosure policy.

If the number of registered appliance is plural (a≥2), the processing proceeds to step S916, where the CPU 230 selects one of the log disclosure policies of the other registered appliances and registers the selected one.

Particularly, the process performed in step S916 is described in detail below with reference to FIG. 27.

Figure 27:
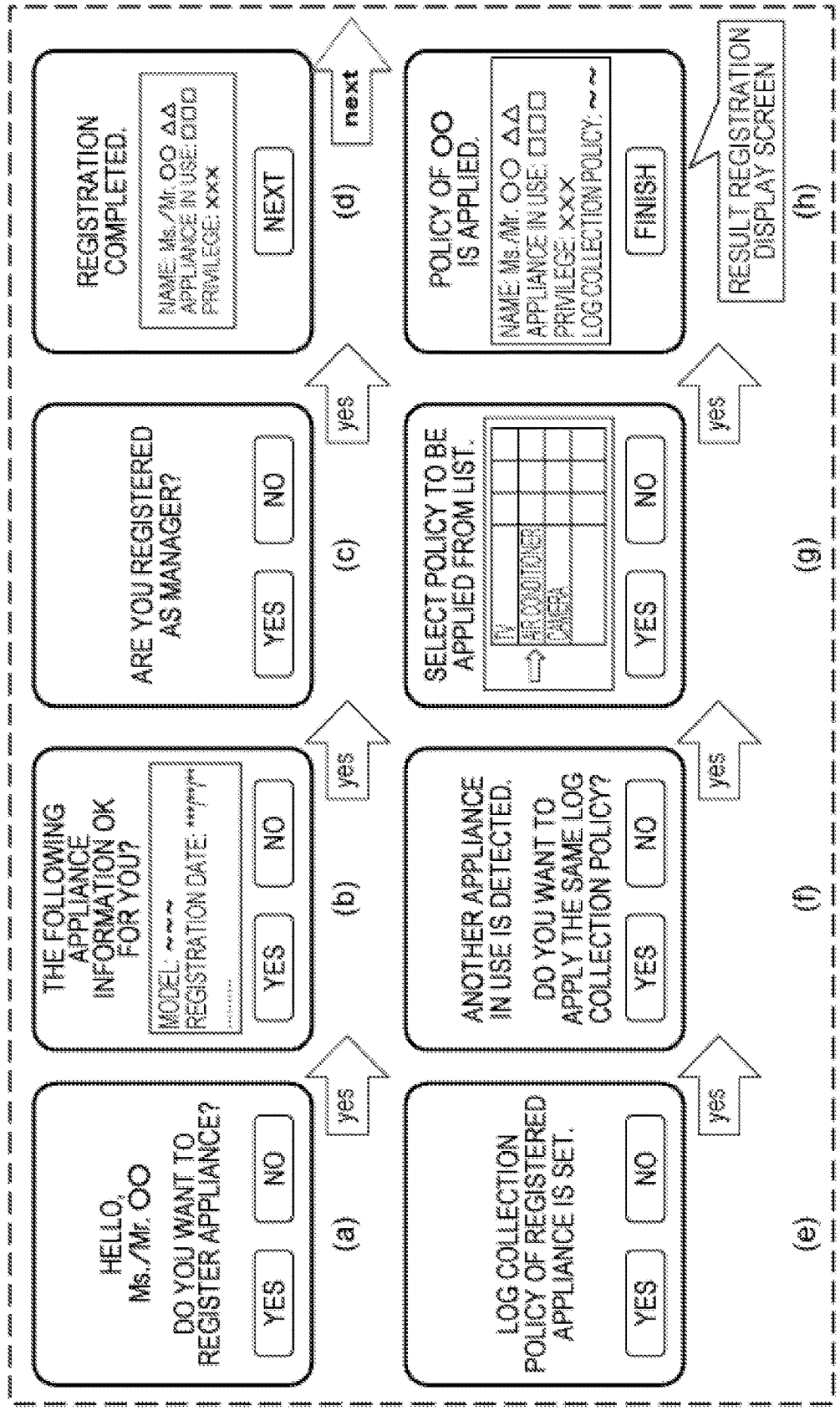
FIG. 27 illustrates an example of a change in information displayed on the display terminal.

FIG. 27 illustrates an example of a change in information displayed on the display terminal 104. As illustrated in FIG. 27, the displayed information is changed from a screen (a) to a screen (h). While the following example is described with reference to the display terminal 104, the information may be displayed on the display of the home appliance 100 if the home appliance 100 has the display. In the following description, "YES" is selected at all times.

If the user utters and, thus, the user is identified, a message asking whether appliance registration is performed is displayed on the display terminal 104 (FIG. 27(a)). Thereafter, a message including the information regarding the appliance is displayed on the display terminal 104 (FIG. 27(b)). Subsequently, a message asking whether the utterer is registered as a manager is displayed on the display terminal 104 (FIG. 27(c)). After the registration with the appliance management DB 24 is completed, a message indicating completion of the registration is displayed (FIG. 27(d)).

Subsequently, setup of the log collection policy is performed (FIG. 27(e)). The CPU 230 refers to the appliance management DB 24 and determines whether the user has already registered another home appliance. If the user has already registered another home appliance, the CPU 230 outputs a message indicating that another appliance in use is detected and asking whether the log collection policy of the home appliance 100 to be registered using the log collection policy of the already registered appliance is set up (FIG. 27(f)).

If the user selects setup of the log collection policy of the home appliance 100 to be registered using the log collection policy of the registered appliance, the CPU 230 displays the information of a plurality of appliances registered in the appliance management DB 24 at the same time. The displayed screen includes information regarding the disclosure policy and the destination of the log (FIG. 27(g)).

When the user selects one of the appliances, the CPU 230 registers, as the log collection policy of the home appliance 100 to be registered, the log collection policy of the selected particular appliance in the appliance management DB 24 in association with the user ID of the user. As a result, the CPU 230 sends the information regarding the registration to the display terminal 104, and the display terminal 104 displays the information. More specifically, information is displayed on the display terminal 104 indicating that the log collection policy of the selected particular appliance is registered in the appliance management DB 24 as the log collection policy of the home appliance 100 to be registered in association with the user ID of the user (FIG. 27(h)).

Note that if the number of registered appliances is one, only the information regarding the registered appliance is displayed in FIG. 27(g), and the log collection policy is selected (step S914 of FIG. 26).

15. Process to Update Appliance Management DB Performed by Management Server

Figure 28:
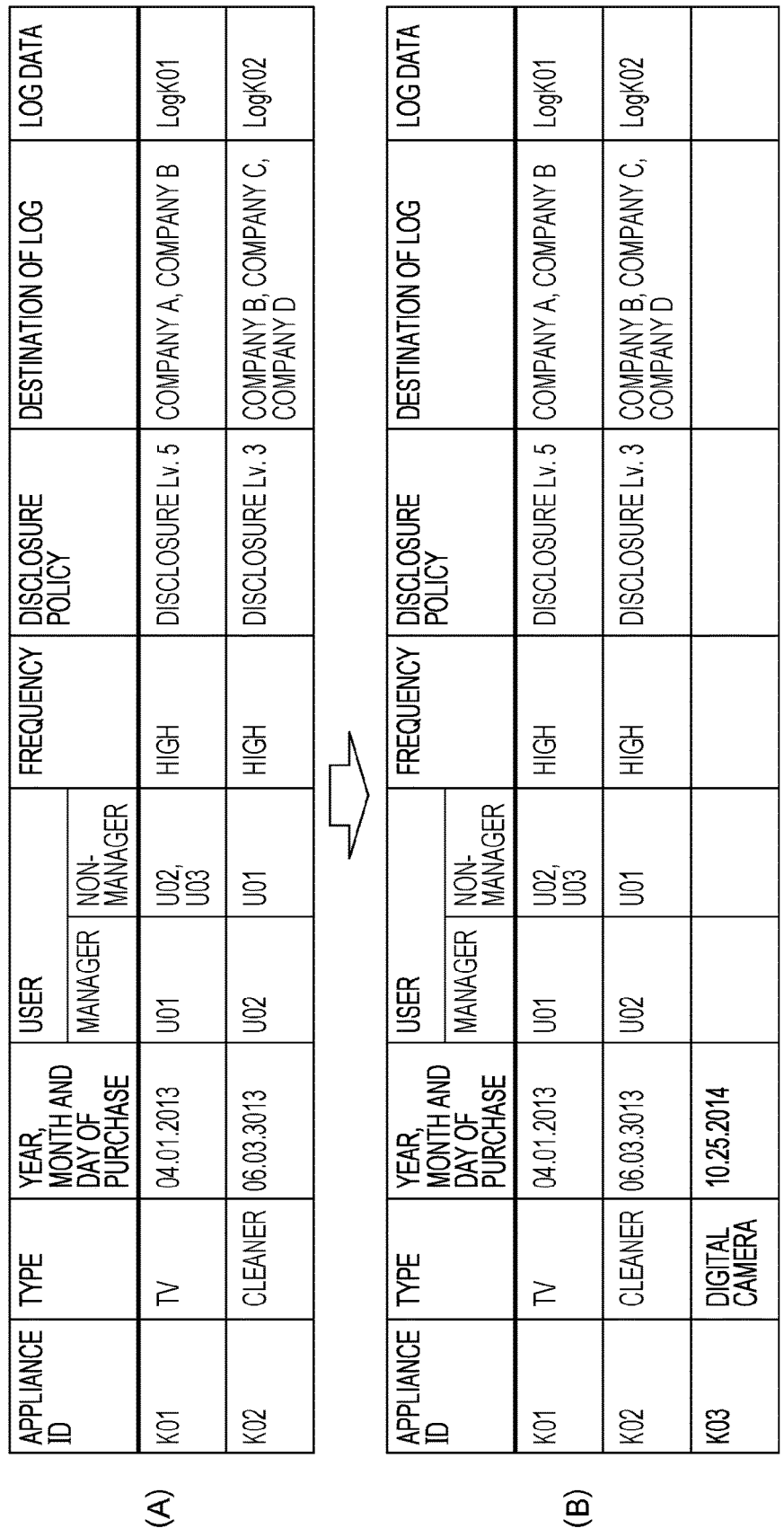
FIG. 28 illustrates an example in which a new user is registered in the appliance management DB as a manager of an unregistered appliance (a digital camera)

FIGS. 28 to 30 illustrate an example of updating the appliance management DB 24 through the processes related to FIGS. 26 and 27.

FIG. 28 illustrates an example in which a new user is registered in the appliance management DB 24 as a manager of an unregistered appliance (a digital camera). As can be seen from FIG. 28, the entry having a new appliance ID of "K03" for the digital camera is added to the appliance management DB 24. Basic information including the appliance ID, the type, and the year, month and day of purchase is registered in the appliance management DB 24 first. FIG.

29 illustrates the appliance management DB 24 having a user having a user ID of "U03"(a son (FIG. 23)) added thereto.

In addition, FIG. 30 illustrates the appliance management DB 24 to which existing management information regarding a TV is applied as management information regarding the disclosure policy of log information regarding the digital camera and the destination of log of the digital camera. This example illustrates an example in which the user selects the disclosure policy of the TV. As can be seen from FIG. 30, setting values of the disclosure policy of the TV and the destination of log are copied as the setting values of the digital camera.

As described above, by simply selecting an already registered appliance, the user can use the setting information of the appliance as the setting values of the home appliance 100. Since the user need not input all the information every time, the convenience of the user can be improved.

16. Appliance Registration Process on Initial Registration by User (Additional Update of User Management DB)

Figure 31:
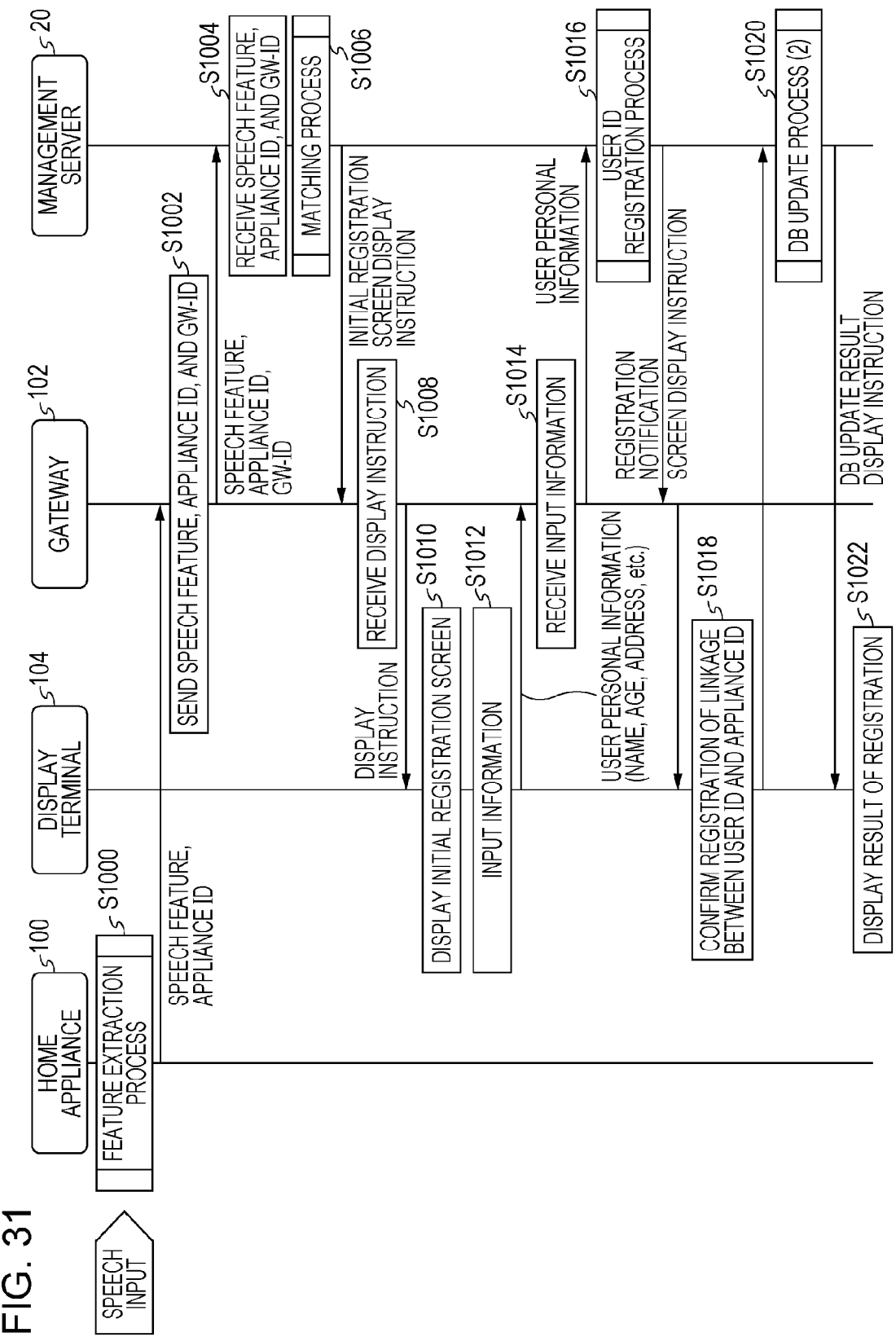
FIG. 31 illustrates a sequence of communication processes performed when the user registers an appliance together with the user information for the first time and, thereafter, accepts the registered information or corrects the registered information.

FIG. 31 illustrates the sequence of communication processes performed when the user registers an appliance together with the user information for the first time and, thereafter, accepts the registered information or corrects the registered information. Unlike the sequence illustrated in FIG. 11, in the sequence illustrated in FIG. 31, appliance registration is performed at the same time as the user ID registration. Such a difference, that is, steps S1018 to S1022, is described below. Since steps S1000 to S1016 are the same as those of FIG. 11, descriptions of steps S1000 to S1016 are not repeated.

In step S1018, a confirmation message that is sent from the management server 20 and that asks whether the user ID is associated with the appliance ID and registration is made is displayed on the display terminal 104. If the user accepts the message, the CPU 230 updates the appliance management DB 24 in step S1020. As a result, the user ID is registered in association with the appliance ID. The CPU 230 sends display information indicating the result of registration to the display terminal 104. Note that the details of the process performed in step S1020 are illustrated in FIGS. 32 and 33 and are described blow.

In step S1022, the display terminal 104 displays the result of registration on the basis of the received display information. Thus, the user can be aware that the home appliance 100 has been registered.

17. Process (2) to Update User Management DB Performed by Management Server

Figure 32:
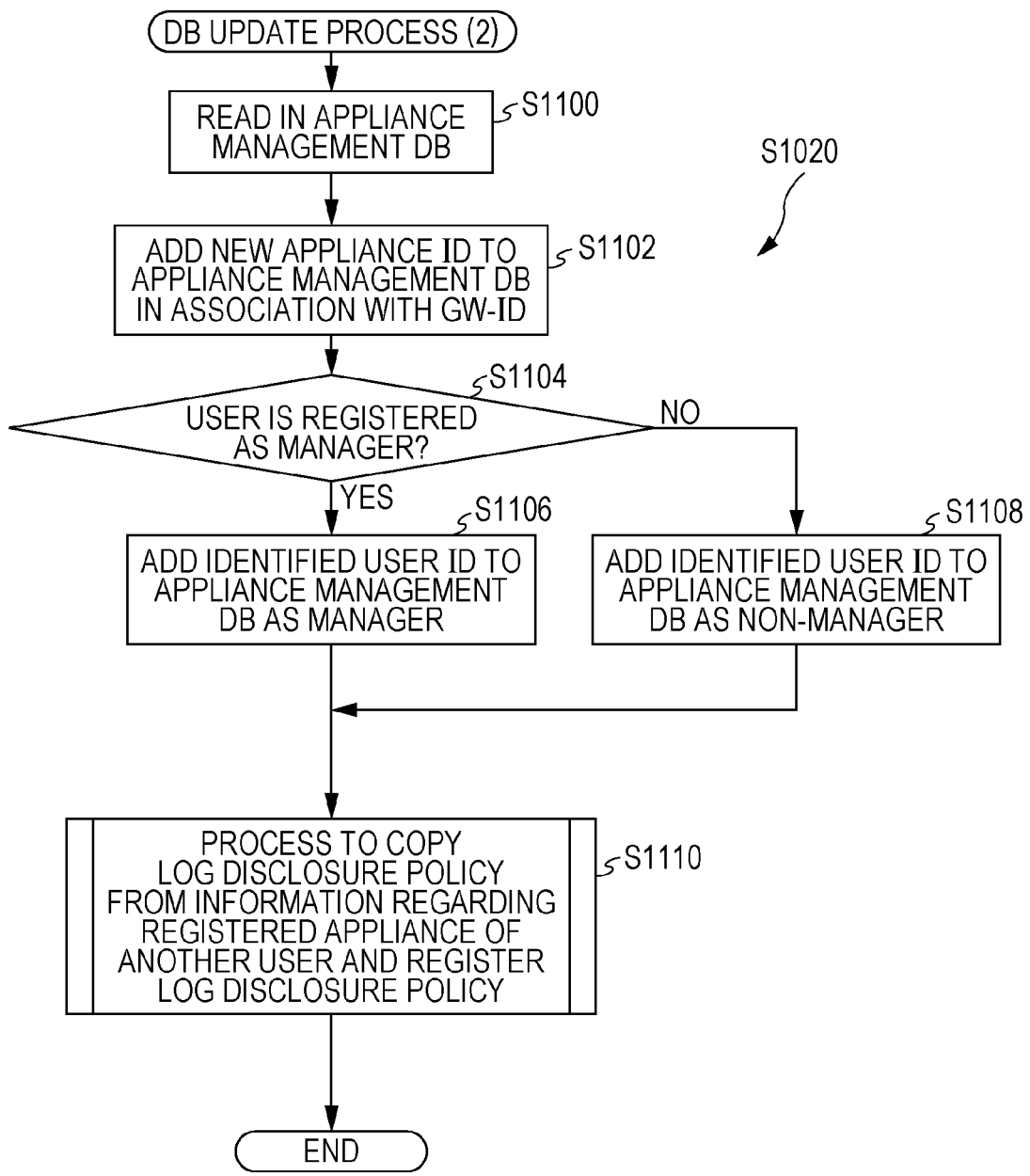
FIG. 32 is a flowchart of the procedure for a process to update the appliance management DB.
Figure 33:
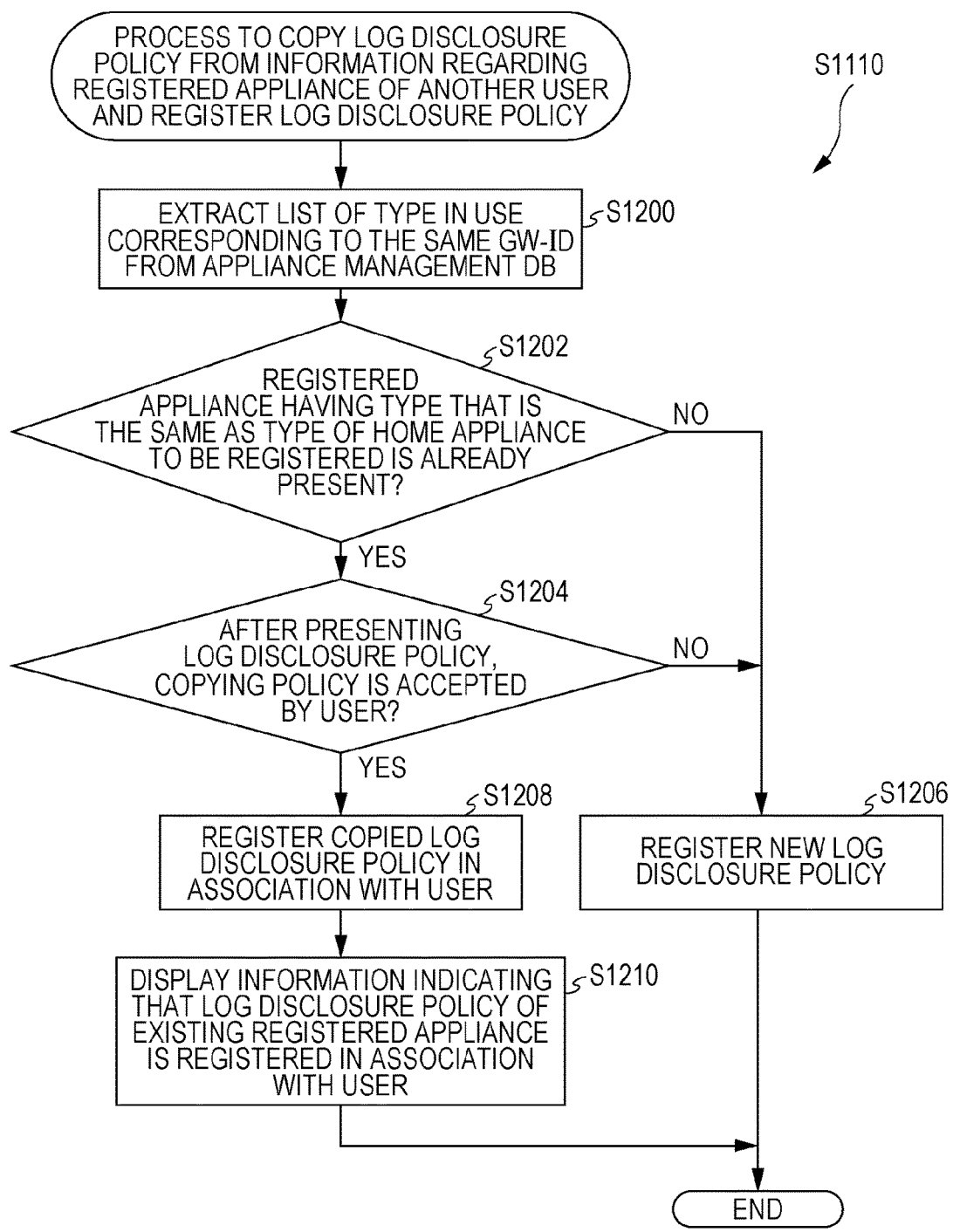
FIG. 33 is a flowchart illustrating the process performed in step S1110 of FIG. 32 in detail.

FIGS. 32 and 33 illustrate the procedure for the process to update the appliance management DB 24. This process is a detailed process performed in step S1020 in FIG. 31. That is, this process is performed by the management server 20.

The processes in steps S1100 to S1108 of FIG. 32 are the same as those in steps S900 to S908 of FIG. 26, respectively. Accordingly, descriptions of the processes in steps S1100 to S1108 are not repeated.

In step S1110, the CPU 230 copies the log disclosure policy in the information regarding a registered appliance of another user and performs registration using the copied log disclosure policy. The reason why the "information regarding a registered appliance of another user" is used is that as described above, FIG. 31 illustrates the process to register the user ID of the user for the first time and, thus, an already registered appliance of the user is not present.

FIG. 33 is a flowchart illustrating the process performed in step S1110 of FIG. 32 in detail.

In step S1200, the CPU 230 of the management server 20 extracts, from the appliance management DB 24, a list of the type of appliance associated with the same gateway ID.

In step S1202, the CPU 230 determines whether a registered appliance having a type that is the same as the type of the home appliance 100 to be registered is already present. If a registered appliance having the same type is already present, the processing proceeds to step S1204. However, if a registered appliance having the same type is not present, the processing proceeds to step S1206.

In step S1204, the CPU 230 presents the log disclosure policy of the detected registered appliance having the same type and, thereafter, determines whether copying the policy is accepted by the user. If copying the policy is accepted by the user, the processing proceeds to step S1208. However, if copying the policy is not accepted by the user, the processing proceeds to step S1206.

In step S1206, the CPU 230 registers a log disclosure policy of the home appliance 100 to be registered using an instruction received from the user or a pre-specified log disclosure policy.

In step S1208, the CPU 230 copies the log disclosure policy that is set for an existing registered appliance and that is accepted by the user and registers the log disclosure policy as the log disclosure policy of the home appliance 100 to be registered.

In step S1210, the CPU 230 outputs display information indicating that the log disclosure policy of the existing registered appliance is registered in the appliance management DB 24 in association with the user ID of the user and the appliance ID. As a result, the information is displayed on the display terminal 104 and, thus, the user can be aware of the result of registration.

18. Process to Correct Setup Log Disclosure Policy

Figure 34:
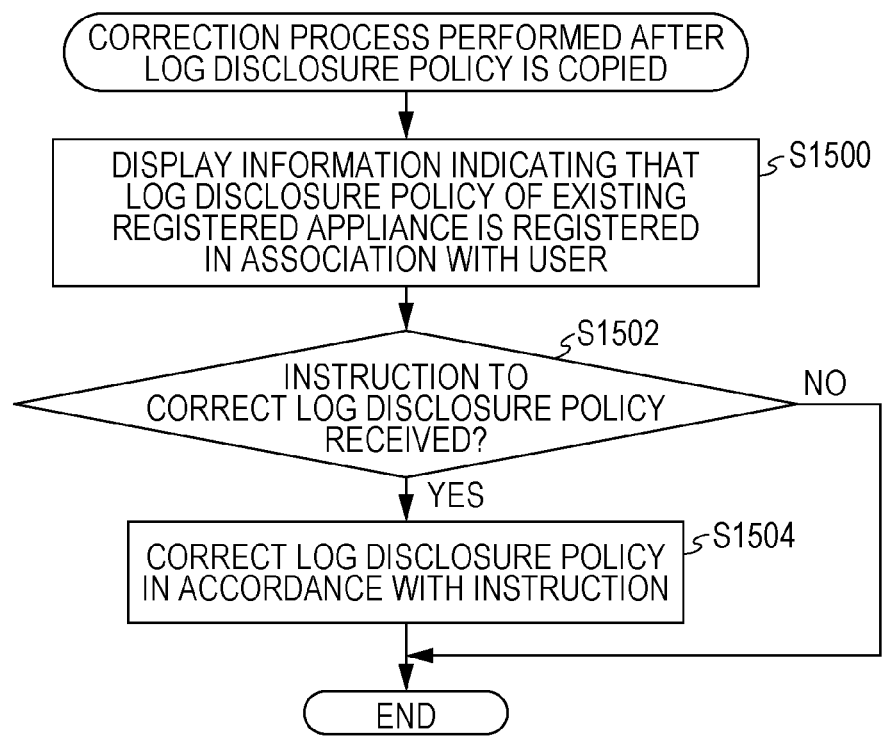
FIG. 34 is a flowchart illustrating the procedure for a process to correct the log disclosure policy of a newly registered appliance when the log disclosure policy is set up using the log disclosure policy of an existing registered appliance.

FIG. 34 is a flowchart illustrating the procedure for a process to correct the log disclosure policy of a newly registered appliance when the log disclosure policy is set up using the log disclosure policy of an existing registered appliance. This process is performed by the management server 20. Note that this process may include a process to correct the destination of log.

In step S1500, the CPU 230 of the management server 20 sends, to the display terminal 104, display information indicating that the log disclosure policy of the existing appliance has been registered in association with the user. The user can verify the details of the registration displayed on the display terminal 104.

Figure 35:
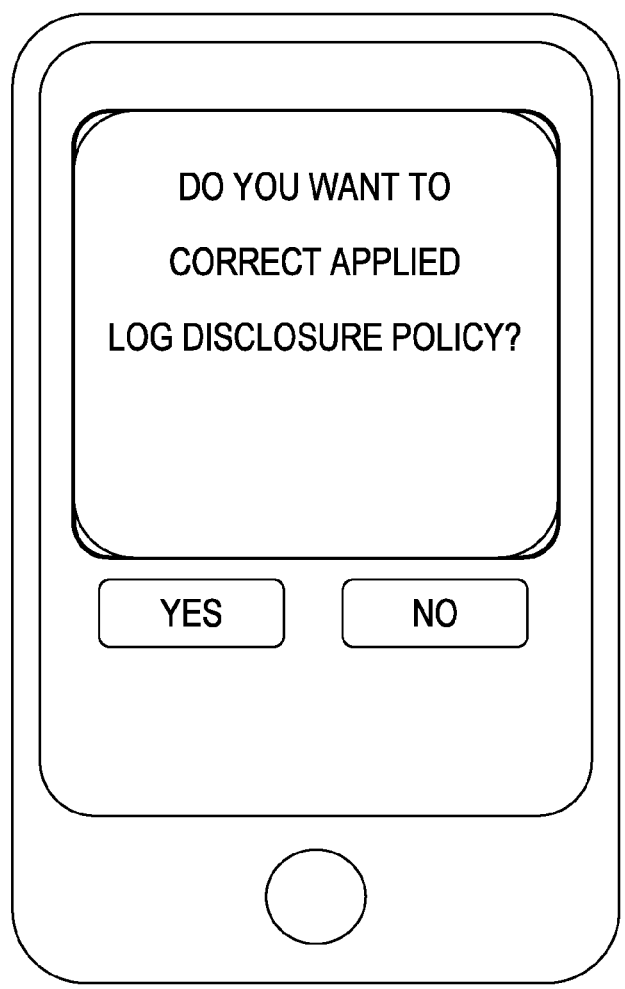
FIG. 35 illustrates an example of a screen asking whether an instruction to correct the log disclosure policy is required.

In step S1502, the CPU 230 determines whether an instruction to correct the log disclosure policy is received from the user. FIG. 35 illustrates an example of a screen asking whether an instruction to correct the log disclosure policy is required. If the user selects "YES", the CPU 230 determines that a correction instruction is received and, thus, the processing proceeds to step S1504. However, if the user selects "NO", the CPU 230 determines that a correction instruction is not received and, thus, the processing is completed.

In step S1504, the CPU 230 corrects the log disclosure policy in accordance with the instruction. For example, the CPU 230 may display the information regarding the registered appliance in the appliance management DB 24 illustrated in FIG. 30 and allow the user to edit the information. To prevent incorrect setup, selectable log disclosure policies and selectable destinations of log for the appliance to be updated may be listed in the pull-down menu of each of the entries, and one of them may be selected by the user. Any method for editing the policies can be employed.

19. Modifications

19.1 Modification for Information Management System without Gateway

While the above-described embodiment has been described with reference to the information management system 1 including the gateway 102, the need for the gateway 102 may be eliminated.

Figure 36:
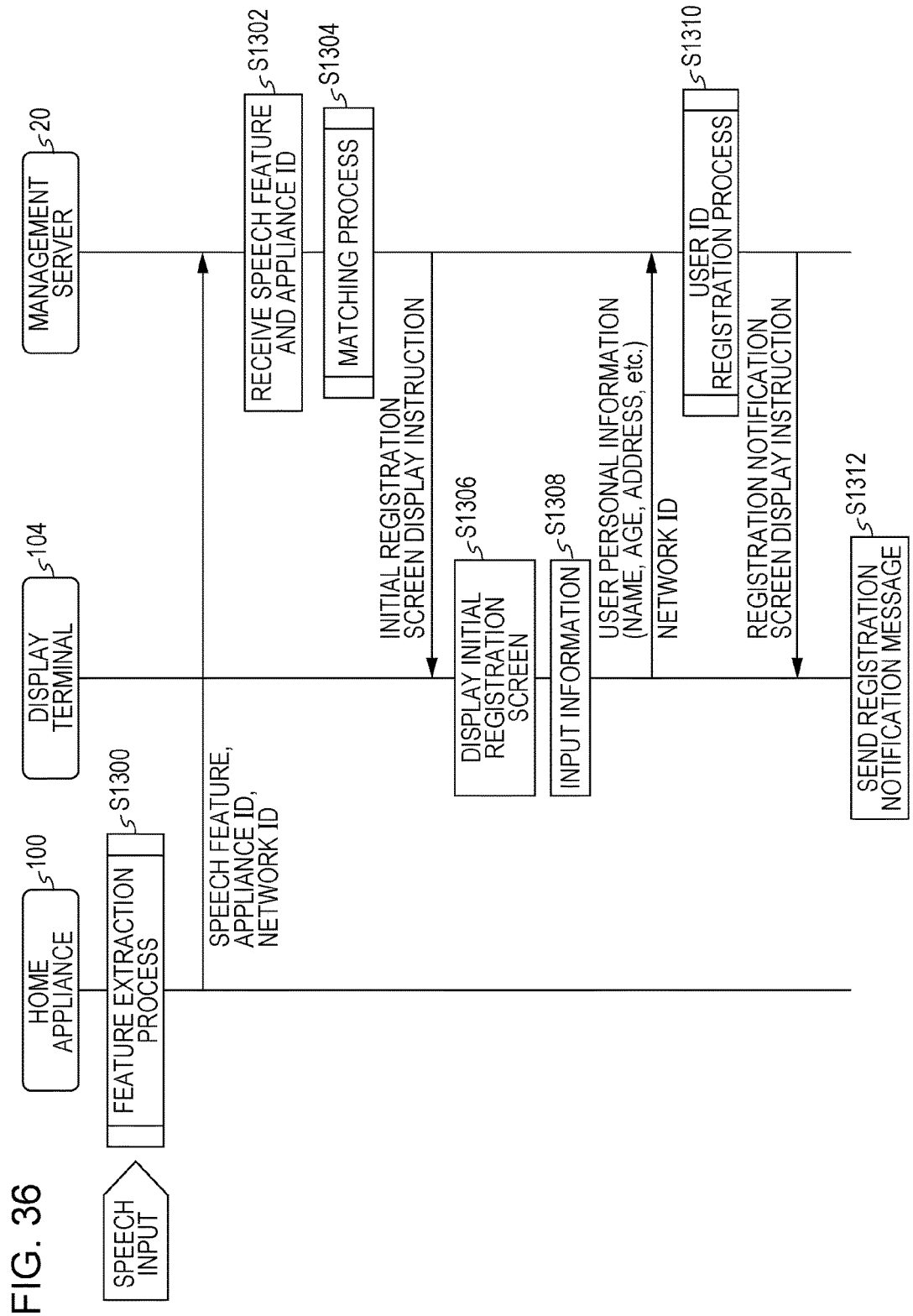
FIG. 36 illustrates a sequence of communication processes performed when the user registers an appliance together with the user information for the first time in the information management system without a gateway.

FIGS. 36 and 37 illustrate the sequence of communication processes performed when the user registers an appliance together with the user information for the first time in the information management system without a gateway. Unlike the sequence in the above-described information management system 1 having a gateway, in the sequence illustrated in FIGS. 36 and 37, a home appliance further sends a network identifier (network ID) together with the speech feature and the appliance ID. According to the above-described embodiment, the identifier of the gateway 102 (the gateway ID) is used as information for identifying the area of a family. Like the gateway ID, the network ID is provided to identify the area of a family (an area including the target user). By replacing the gateway ID used in the above-described embodiment with the network ID, a description that is the same as the above description can apply. For example, the network ID can be stored in the user management DB 22 and the appliance management DB 24 instead of the gateway ID. For example, if a wireless communication environment based on the IEEE 802.11 standard is provided in the home LAN, the SSID (Service Set Identifier) of the wireless LAN can be used as the network ID.

Note that descriptions of the processes illustrated in FIGS. 36 and 37 are the same as the descriptions of the processes illustrated in FIGS. 11 and 24, respectively, if the process related to the gateway 102 is removed. Accordingly, descriptions of the processes are not repeated.

19.2 Another Example Related to Biological Information

In the above-described embodiment, the example in which speech is used as the biological information regarding a user is described. However, speech is only an example. As another example, the fingerprint, retina, iris, vein pattern, handwriting, and lip movement of the user can be employed as the biological information.

In recent years, a fingerprint sensor has been mounted in, for example, a PC. By mounting such a fingerprint sensor in the home appliance 100, information regarding the fingerprint of the user can be obtained as the biological information.

To obtain the information regarding the retina of the user, the blood capillary spatial pattern of the retina of the eye of the user may be recognized. In addition, to obtain the information regarding the iris of the user, recognition using the histogram of the gray value of the iris pattern may be performed. In either case, by mounting a dedicated scanning device in the home appliance 100, the information regarding the retina or the iris of the user can be obtained as the biological information.

To obtain the information regarding the vein patter of the user, near-infrared light is passed through the flat or back of the user's hand or a finger of the user's hand to obtain the vein patter, which is used as the feature of the user. For example, by mounting a source of near-infrared light and a camera in the home appliance 100, the information regarding the vein spatial pattern of the user can be obtained as the biological information.

To use handwriting, a habit, such as changes in the trajectory, the speed, and the writing pressure, of user's handwriting is obtained as the feature of the user. For example, if the home appliance 100 includes a display unit of a touch panel type, information regarding the handwriting of the user can be obtained. In this manner, the information regarding the handwriting of the user can be obtained as the biological information.

To use lip movement, a habit of the movement of the lip when the user utters (lip movement) is used as the feature of the user. For example, if the home appliance 100 includes a camera, the lip movement of the user can be obtained. In this manner, the lip movement of the user can be obtained as the biological information.

In the above description, the information that is maintained in, for example, the user management DB 22 or the appliance management DB 24 and that requires user's confirmation is displayed on the display terminal 104 using, for example, characters. However, this is only an example. The information may be presented using speech. According to the present embodiment, the home appliance 100 includes the microphone 110 (FIG. 5). Accordingly, by additionally providing a speaker, an appliance that is used for user ID registration, appliance ID registration, and a log collection policy by using only speech can be selected.

20. Type of Cloud Service that Realize Information Management System

The technology described in the above-described embodiment is realized in, for example, the types of cloud service described below. However, the type of cloud service is not limited thereto. Note that the same reference numeral is used to indicate a constituent element that is the same as the constituent element illustrated in FIG. 38.

20.1. Type 1 of Service: Cloud Service of Company-Owned Data Center Type

FIG. 39 illustrates the overall configuration of a service provided by the information management system using the type 1 of service (a cloud service of a company-owned data center type). According to this type, the service provider 1200 acquires information from the user group 1000 and provides a service to the user. According to this type, the service provider 1200 has the function of a data center operating company. That is, the service provider 1200 owns the cloud server 1110 that manages big data. Accordingly, a data center operating company does not exist.

According to this type, the service provider 1200 operates and manages a data center (a cloud server) 2030. In addition, the service provider 1200 manages an operating system (OS) 2020 and an application 2010. The service provider 1200 provides a service using the OS 2020 and the application 2010 that the service provider 1200 manages (an arrow 2040).

20.2. Type 2 of Service: Cloud Service Using IaaS

Figure 40:
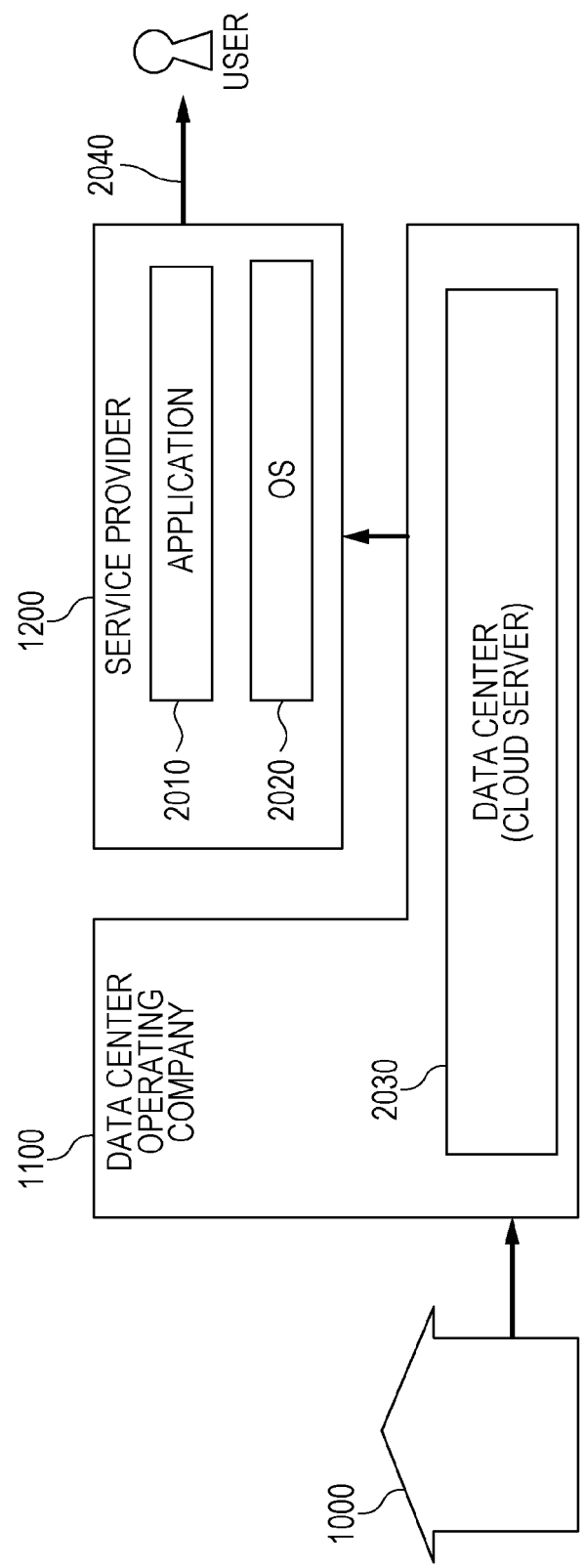
FIG. 40 illustrates the overall configuration of a service provided by the information management system using the type 2 of service (a cloud service using IaaS)

FIG. 40 illustrates the overall configuration of a service provided by the information management system using the type 2 of service (a cloud service using IaaS). As used herein, "IaaS" stands for "Infrastructure as a Service". That is, IaaS represents a cloud service providing model that provides the infrastructure for building a computer system and operating the computer system via the Internet.

According to this type, the data center operating company 1100 operates and manages the data center (the cloud server) 2030. In addition, the service provider 1200 manages the OS 2020 and the application 2010. The service provider 1200 provides a service using the OS 2020 and the application 2010 that the service provider 1200 manages (an arrow 2040).

20.3. Type 3 of Service: Cloud Service Using PaaS

Figure 41:
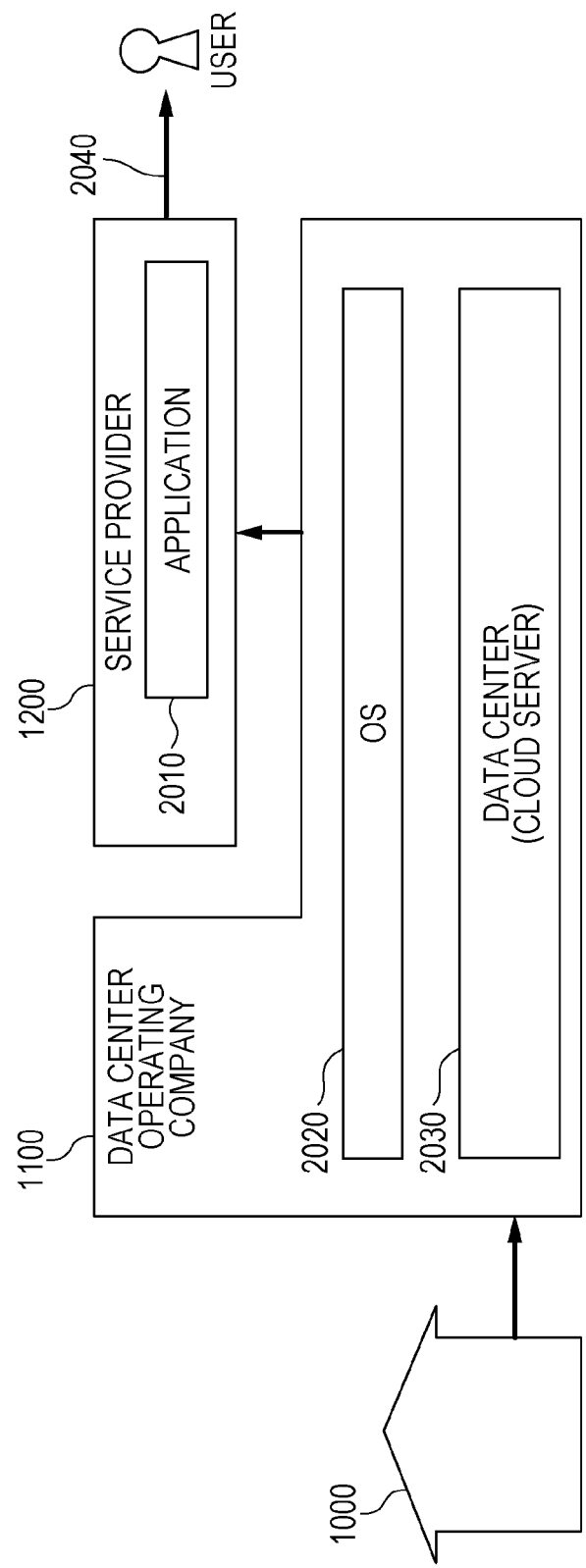
FIG. 41 illustrates the overall configuration of a service provided by the information management system using the type 3 of service (a cloud service using PaaS)

FIG. 41 illustrates the overall configuration of a service provided by the information management system using the type 3 of service (a cloud service using PaaS). As used herein, "PaaS" stands for "Platform as a Service". That is, PaaS represents a cloud service providing model that provides the platform for building software and running the software as a service provided via the Internet.

According to this type, the data center operating company 1100 manages the OS 2020 and operates and manages the data center (the cloud server) 2030. In addition, the service provider 1200 manages the application 2010. The service provider 1200 provides a service using the OS 2020 managed by the data center operating company 1100 and the application 2010 managed by the service provider 1200 (an arrow 2040).

20.4. Type 4 of Service: Cloud Service Using SaaS

Figure 42:
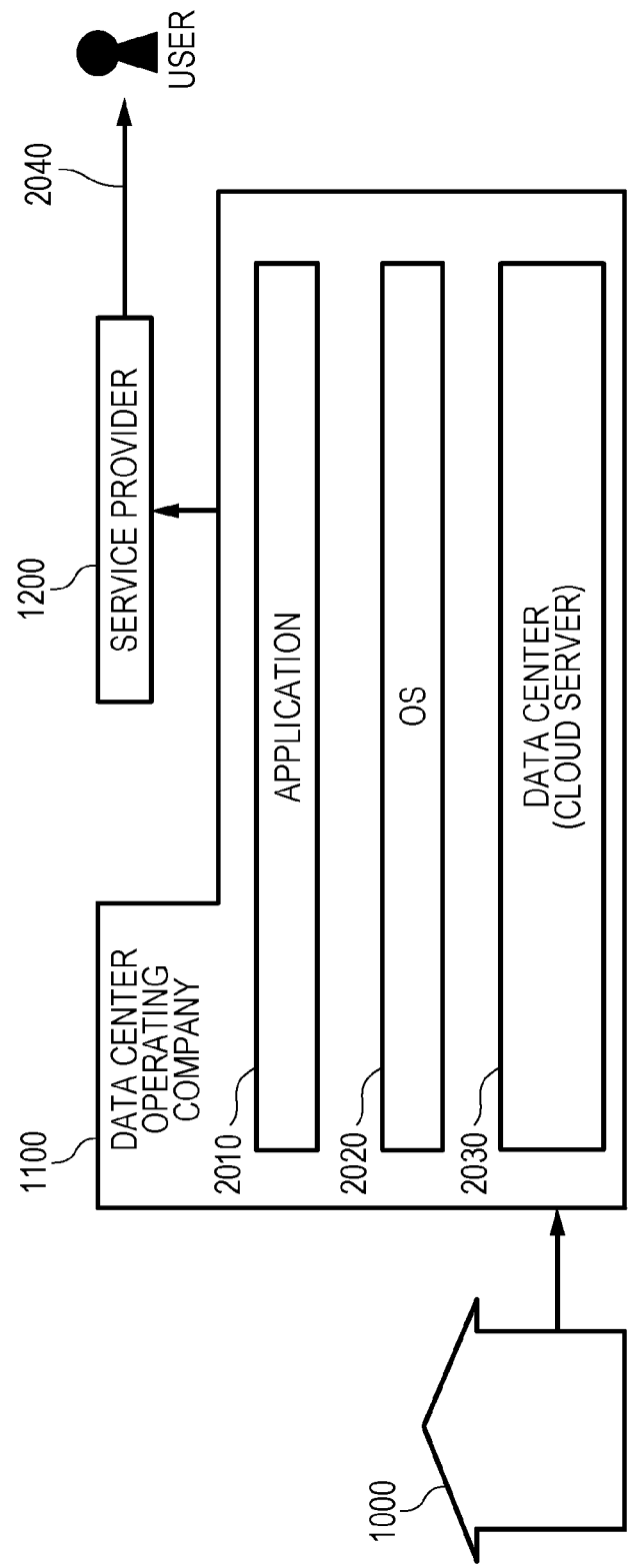
FIG. 42 illustrates the overall configuration of a service provided by the information management system using the type 4 of service (a cloud service using SaaS).

FIG. 42 illustrates the overall configuration of a service provided by the information management system using the type 4 of service (a cloud service using SaaS). As used herein, "SaaS" stands for "Software as a Service". That is, a cloud service using SaaS represents a cloud service providing model having a function that allows a user, such as a company or an individual that does not own a data center (a cloud server), to use, for example, an application provided by a platform provider that owns a data center (a cloud server) via a network, such as the Internet.

According to this type, the data center operating company 1100 manages the application 2010, manages the OS 2020, and operates and manages the data center (the cloud server) 2030. In addition, the service provider 1200 provides a service using the OS 2020 and the application 2010 managed by the data center operating company 1100 (an arrow 2040).

As described above, in any one of the types of cloud service, a service is provided by the service provider 1200. In addition, for example, the service provider or the data center operating company may develop, for example, the OS, the applications, or a database of big data by themselves or may outsource the development to a third party.

The present disclosure is effective when the present disclosure is realized in the form of an information management system that provides a cloud service. In addition, the present disclosure is effective when a user and an appliance are registered in the information management system in association with each other.

What is claimed is:

1. An information management method for use in an information management system that collects, from at least one of target appliances, log information regarding the at least one of target appliances via a home gateway and manages the log information, the method comprising:
   receiving, by a receiver, an appliance identifier of a target appliance seeking registration, a gateway identifier of the home gateway, and biological information of a user of the target appliance; extracting, by a processor and from the biological information, identifying information of the user associated with the biological information received by the receiver;
   determining, by the processor, that the user of the target appliance corresponds to an existing user registered in a database;
   determining, by the processor, whether among other appliances previously registered and associated with the gateway identifier, a log collection policy associated with the user corresponding to the biological information has been previously registered in the database;
   when the log collection policy associated with the user is determined to be previously registered in the database:
   applying, by the processor, a copy of the previously registered log collection policy of at least one of the other appliances previous registered as a new log collection policy to the target appliance, and
   registering, by the processor, the new log collection policy of the target appliance in association with the user of the biological information; and
   sending, by a transmitter to an information terminal, display information indicating that the previously registered log collection policy is applied and registered as the new log collection policy for the target appliance in association with the user of the biological information,
   if it is determined that the log collection policy associated with the user of the biological information for the at least one of the other appliances is not previously registered in the database, determining, by the processor, whether the log collection policy for the at least one of the other appliances is of a same type as a type of the target appliance seeking registration is registered in the database, the at least one of the other appliance being associated with the gateway identifier;
   if it is determined that the log collection policy for at least one of the other appliances is of the same type as the type of the unregistered target appliance is registered in the database, registering , by the processor, the log collection policy for the at least one of the other appliances of the same type as the type of the target appliance seeking registration, as the new log collection policy for the target appliance registration in association with the user of the biological information; and
   sending, by the transmitter, to the information terminal, display information indicating that the log collection policy of the at least one of the other appliances of the same type is registered as the new log collection policy of the target appliance seeking registration in association with the user of the biological information.

2. The information management method according to claim 1, further comprising:
   if it is determined that the log, collection policy associated with the user of the biological information for the at least one of the other appliances is not previously registered in the database, sending, by the transmitter to the information terminal, a message prompting the user to input log collection policy information for the target appliance seeking registration.

3. The information management method according to claim 1, further comprising:
   if it is determined that the log collection policy of at least one of the other appliances of the same type as the type of the target appliance seeking registration is not registered in the database, sending by the transmitter to the information terminal, a message prompting the user to input log collection policy information for the target appliance seeking registration.

4. The information management method according to one of claim 1, further comprising: receiving, by the receiver, after sending the display information, instruction information indicating a correction of the new log collection policy of the target appliance registered as registration information of the target appliance; and
   correcting the registration information registered in the database as the new log collection policy of the target appliance based on the instruction information.

5. The information management method according to any one of claim 1, wherein the display information is sent to the information terminal in response to an access of the information terminal to the information management system.

6. The information management method according to claim 1, wherein the biological information includes information representing speech of the user.

7. The information management method according to claim 1, wherein the biological information includes information representing a fingerprint of the user.

8. The information management method according to claim 1, wherein the biological information includes information representing a blood capillary spatial pattern of the retina of the user.

9. The information management method according to claim 1, wherein the biological information includes information representing a feature of the iris of the user.

10. The information management method according to claim 1, wherein the biological information includes information representing a vein spatial pattern of the user.

11. The information management method according to claim 1. wherein the biological information includes one of the shape of a palm, the face, the shape of an ear, at least one of a trajectory, a speed, and a writing pressure occurring in handwriting, and lip movement of the user.

12. The information management method according to claim 1, wherein the log collection policy previous registered includes a user ID representing the user.

13. The information management method according to claim 1, wherein the log collection policy previous registered includes a type of log information collected from each of the at least one of the target appliances.

14. The information management method according to claim 13, wherein the type of log information includes power status information to indicate whether each of the at least one of the target appliances is powered on/off.

15. The information management method according to claim 1, wherein the log collection policy previous registered is information representing a business operator that provides the log information collected from each of the at least one of the target appliances.

16. An information management method for use in an information management system that collects, from at least one of target appliances, log information regarding the at least one of target appliances via a network and manages the log information, the method comprising:

receiving, by a receiver, an appliance identifier of a target appliance seeking registration, a network identifier for identifying a network area to which the at least one of users belongs, and biological information of a user of the target appliance;

extracting, by a processor and from the biological information, identifying information of the user associated with the biological information received by the receiver;

determining, by the processor, that the user of the target appliance corresponds to an existing user registered in a database;

determining, by the processor, whether among previously registered appliances associated with the network identifier, a log collection policy associated with the user corresponding to the biological information has been previously registered in the database;

when the log collection policy associated with the user is determined to be previously registered in the database:

applying, by the processor, a copy of the previously registered log collection policy of at least one of the other appliances previous registered as a new log collection policy to the target appliance, and registering, the processor, the new log collection policy of the target appliance in association with the user of the biological information; and sending, by a transmitter to an information terminal, display information indicating that the previously registered log collection policy is applied and is registered as the new log collection policy for the target appliance association with the user of the biological information, if it is determined that the log collection policy associated with the user of the biological information for the at least one of the other appliances 1s not previously registered in the database, determining, by the processor, whether the log collection policy for the at least one of the other appliances is of a same type as a type of the target appliance seeking registration is registered in the database, the at least one of the other appliances being associated with the gateway identifier;

if it is determined that the log collection policy for at least one of the appliances is of the same type as the type of the unregistered target appliance is registered in the database, registering, by the processor, the log collection policy for the at least one of the other appliances of the same type as the type of the appliance seeking registration, as the new log collection policy for the target appliance seeking registration in association with the user of the biological information; and sending, by the transmitter, to the information terminal display information indicating that the log collection policy of the at least one of the other appliance of the same type is registered as the new log collection policy of the target appliance seeking registration in association with the user of the biological.

17. The information management method according to claim 16. wherein the biological information is information representing speech of the user.

* * * * *